(12) United States Patent
Weaver et al.

(10) Patent No.: US 12,475,199 B2
(45) Date of Patent: Nov. 18, 2025

(54) FRESHNESS SCORING FOR PERISHABLES

(71) Applicant: Transparent Path SPC, Seattle, WA (US)

(72) Inventors: Eric Weaver, Seattle, WA (US); Sunil Koduri, Sammamish, WA (US)

(73) Assignee: Transparent Path SPC, Seattle, WA (US)

( * ) Notice: Subject to any disclaimer, the term of this patent is extended or adjusted under 35 U.S.C. 154(b) by 652 days.

(21) Appl. No.: 17/887,212

(22) Filed: Aug. 12, 2022

(65) Prior Publication Data
US 2024/0054191 A1  Feb. 15, 2024

(51) Int. Cl.
*G06F 21/30* (2013.01)
*G06N 20/00* (2019.01)

(52) U.S. Cl.
CPC .............. *G06F 21/30* (2013.01); *G06N 20/00* (2019.01); *Y02A 40/90* (2018.01)

(58) Field of Classification Search
CPC .......... G06F 21/30; G06N 20/00; Y02A 40/90
See application file for complete search history.

(56) References Cited

U.S. PATENT DOCUMENTS

| | | |
|---|---|---|
| 2003/0182260 A1 | 9/2003 | Pickett et al. |
| 2011/0318717 A1 | 12/2011 | Adamowicz |
| 2014/0046869 A1 | 2/2014 | Dear |
| 2016/0275580 A1 | 9/2016 | Uechi |
| 2017/0300856 A1* | 10/2017 | Wilkinson ........... G06Q 10/087 |
| 2018/0005295 A1* | 1/2018 | Howell ............. G06Q 30/0631 |
| 2018/0232689 A1* | 8/2018 | Minvielle ............... G06T 7/194 |
| 2019/0102788 A1* | 4/2019 | Lewis ................ G06Q 30/0206 |
| 2019/0147396 A1* | 5/2019 | Bohling ................... G06N 5/04 705/28 |
| 2019/0180289 A1 | 6/2019 | Klavins |
| 2019/0213532 A1 | 7/2019 | Brightwell et al. |
| 2019/0287182 A1 | 9/2019 | Chetal et al. |
| 2019/0370817 A1 | 12/2019 | Uysal et al. |
| 2020/0279183 A1 | 9/2020 | Chrapko |
| 2022/0027842 A1 | 1/2022 | Brightwell et al. |
| 2022/0300620 A1 | 9/2022 | Brannon |

OTHER PUBLICATIONS

Fahad et a., Fruits and Vegetables Freshness Categorization Using Deep Learning, Nov. 2021, Department of Computer Science, National University of Computer and Emerging Sciences, no page No. (Year: 2021).*
Office Action for U.S. Appl. No. 17/887,248, mailed on Sep. 28, 2024, Weaver, "Transparency Scoring for Perishables", 31 pages.
Konstantinos, et al., "Evaluating the Use of QR Codes on Food Products", Sustainability, No. 8: 4437, retrieved at <<https://doi.org/10.3390/su 14084437>>, 2022, 15 pgs.
Office Action for U.S. Appl. No. 17/887,248, dated Mar. 17, 2025, 17 Pages.

* cited by examiner

*Primary Examiner* — Kidest Bahta
(74) *Attorney, Agent, or Firm* — Lee & Hayes, P.C.

(57) ABSTRACT

Provided herein are techniques, devices, and systems for reducing waste by determining and utilizing scores associated with perishables that have been, or that are in the process of being, transported along a supply chain. A computing system may receive sensor data from a sensor within a threshold distance of the perishable, may provide the sensor data as input to a trained machine learning model, which generates, as output a score relating to a freshness of the perishable. This score and related information can be made accessible to users by associating an identifier with the score and with the information.

20 Claims, 9 Drawing Sheets

FRESHNESS SCORING FOR PERISHABLES

BACKGROUND

In the food supply chain, food moves from the source to the consumer. Sometimes this occurs over long distances and it may involve several hand-offs. Food is perishable, which means that most food products must be maintained within a certain temperature or humidity range throughout the supply chain, else the food may spoil. Today, supply chain data is predominantly paper-based or is contained within disconnected silos. As a result, when supply chain issues occur, they often go unnoticed and cannot be prevented, until it is too late and the food is lost. This results in excessive food waste, not to mention the labor that is required to unload and dispose of the spoiled food. Moreover, spoiled food that goes undetected before it is sold to end consumers may cause consumer frustration at a minimum, and may even result in the spread of foodborne illnesses, and/or reputational issues surrounding food recalls. The disclosure made herein is presented with respect to these and other considerations.

DETAILED DESCRIPTION

Figure 1:
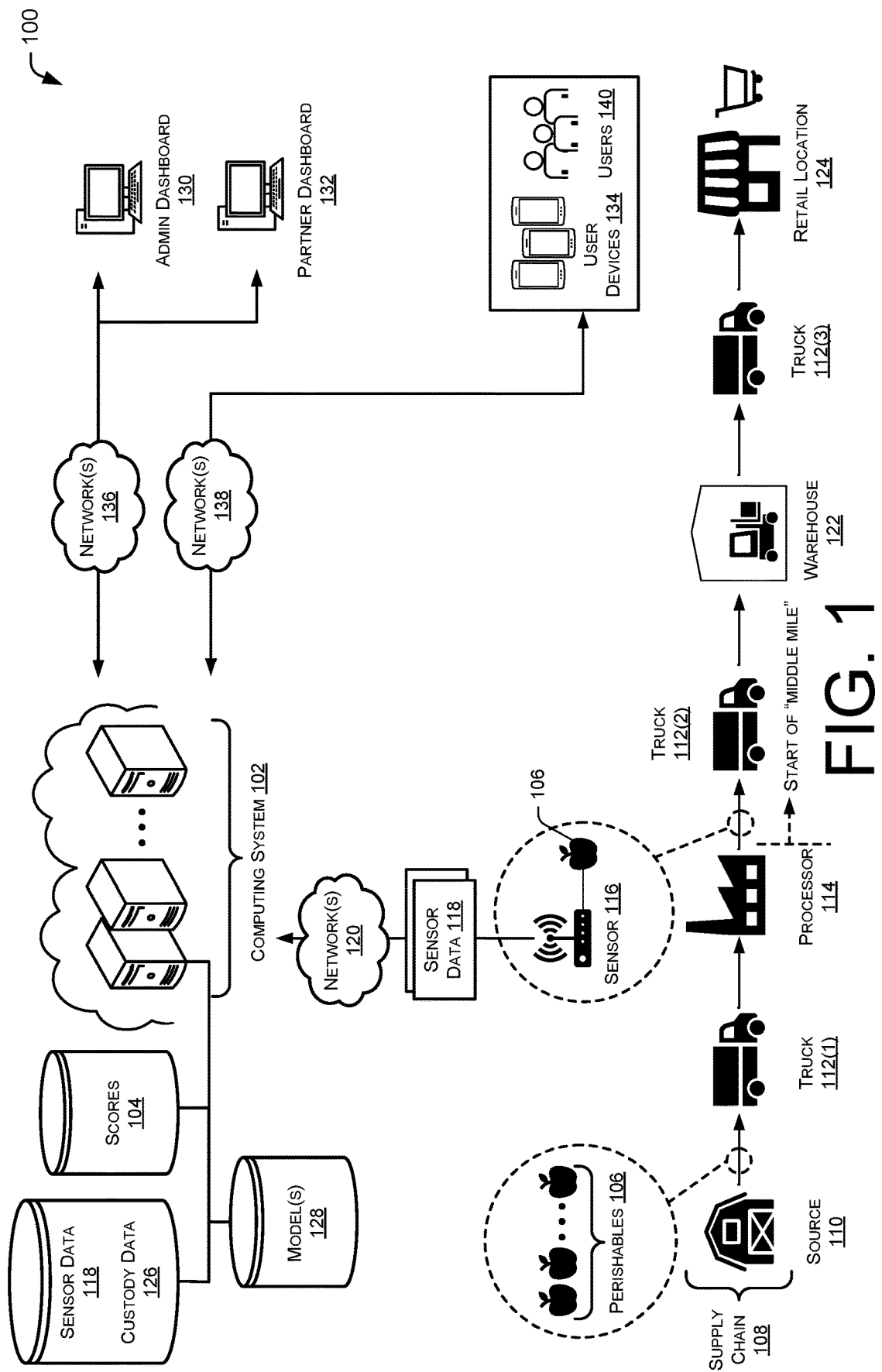
FIG. 1 illustrates an example supply chain tracking platform including an example computing system configured to determine scores associated with perishables that are transported along the supply chain.

Supply chains are used for the distribution of goods. The distribution of perishables, such as food, can be particularly challenging due to the requirement of maintaining the perishables within a range of environmental conditions (e.g., temperature, humidity, air pressure, shock) to avoid spoilage of the perishables. Oftentimes, this means that cold or chilled storage is required to transport perishables, typically using refrigerated shipping containers (also known as "reefers"), as well as refrigerated areas of warehouses that are used to temporarily store the perishables. In the "first mile" of the supply chain, food originating at a source (e.g., a farmer) may be transported to a processor where the food can be processed and packaged in containers for shipment along the "middle mile" of the supply chain. Tracking data (e.g., temperature data) relating to perishable food products while the food products are in transit is mostly done via paper (e.g., printed receipts, invoices, faxing, phone calls, maintaining paper files in filing cabinets, etc.). For example, a truck driver may receive a printed bill of lading when a load of highly-perishable crab meat (fresh or frozen) is picked up at a source of the crab meat. The bill of lading may specify the number of units of crab meat being shipped, as well as the temperature or humidity range in which the crab meat is to remain along the entire supply chain. Once the crab meat is loaded into the truck, the driver, at a time of departure, might check to make sure that the container's refrigeration unit is powered on and/or that the temperature in the container is at, or is otherwise on its way to, a desired temperature within the prescribed temperature range. Oftentimes the temperature in the back of the truck is not otherwise monitored closely, or at all, during transit of the crab meat to its destination. In some cases, the driver might actually turn off the power to the reefer to save fuel, thinking that the temperature of the food will not change too quickly. In this scenario, if the driver forgets to power the reefer back on in a timely manner, the product can become spoiled or its quality compromised. The driver may have no choice but to discard the shipment of spoiled crab meat, or the shipment may be rejected by a retailer upon arrival. As noted above, this can result in excessive food waste, not to mention wasted labor, water, oil and electricity that was used to produce that food. Such outcomes also result in additional labor and cost to unload and dispose of spoiled food, as well as creating consumer dissatisfaction, and possibly causing the spread of foodborne illnesses, and/or reputational issues surrounding food recalls.

Described herein are, among other things, techniques, devices, and systems for reducing waste by determining and utilizing scores associated with perishables that have been, or that are in the process of being, transported along a supply chain. A "perishable," as used herein, is an item that decays, spoils, becomes contaminated, expires, or otherwise goes bad over a period of time. Many examples discussed herein pertain to food (or food products), but perishables, as described herein, are not limited to food and may include, without limitation, other ingestible products, vaccines, organs, blood, plasma, pharmaceuticals, topical creams, ointments, or the like.

In some examples, devices and systems described herein are configured to determine and utilize a score relating to a transparency of information associated with a perishable. This type of score is sometimes referred to herein as a "ProofScore®." In some examples, the information associated with the perishable includes information about a "producer" of the perishable, such as information about a farmer, a grower, a manufacturer, a processor, a distributor, or the like. Accordingly, an organizational ProofScore may be assigned to any suitable entity associated with the supply chain for the perishable in question. In other examples, the information associated with the perishable includes information about the perishable itself, such as a temperature history of the perishable during transit of the perishable along the supply chain. Accordingly, a product ProofScore may be assigned to the perishable itself. Accordingly, at least two types of ProofScores are disclosed herein, but it is to be appreciated that there may be additional types of ProofScores and/or a single ProofScore may be utilized. The devices and systems described herein for determining ProofScores associated with perishables helps to foster transparency of information, as well as data accessibility, collaboration, risk mitigation, and trustworthiness across customers and partners. Accordingly, the more data associated with a perishable that is shared by an entity(ies) associated with the supply chain, the higher the ProofScore associated with that perishable.

A ProofScore(s) may be computed for a given perishable based on at least two factors: (i) the importance of the shared data associated with the perishable; and (ii) the completeness of the shared data associated with the perishable. For example, a computing system may receive a first type of data associated with a perishable and a second type of data associated with the perishable. The received data may have been shared by an entity involved in the supply chain of the perishable, such as a farmer. By evaluating the received data, the computing system may determine respective sub scores for each type of data received based on the importance and the completeness of the respective types of data. For instance, if the first data is more important than the second data, the first data may be assigned a greater importance weight than the second data. Moreover, the first data and the second data may be assigned respective completeness weights, which may be the same or different, depending on the completeness of the respective types of data received. The sub scores calculated for each type of data based on these weights may then be used to compute the ProofScore associated with the perishable, which may be a producer ProofScore or a product ProofScore, as described herein.

Users may be provided access to the ProofScore(s) determined for a given perishable. For example, the ProofScore(s) may be associated with an identifier in a database. In addition to the ProofScore, related information associated with the perishable may be associated with the identifier. Thereafter, if a request received from a user computing device includes the identifier for accessing the ProofScore(s) and/or the information related thereto, the computing system may use the identifier to lookup the ProofScore(s) and/or the information and cause the ProofScore(s), the information, and/or one or more interactive elements (e.g., links, buttons, etc.) for accessing the information to be displayed on a display of the user computing device. By making the ProofScore(s) and related information associated with a perishable accessible to consumers of the perishable, for example, the consumers can be incentivized to pay a higher price for a product that they know more about. For example, the information accessible to the consumer of the perishable may include information about the origin of the perishable (e.g., where it came from), the provenance of the perishable (e.g., how it got to the consumer), and the environmental history of the perishable (e.g., what happened to it along the way to the consumer). Any margin collected from the higher price can be shared across the supply chain with partners as a financial incentive for providing this transparency of information associated with the perishable. Accordingly, the consumer has access to additional information about the perishable product that's being consumed or used, and partners of the supply chain receive additional revenue for sharing the data associated with the perishable. The more data associated with the perishable that is shared, the more revenue can be collected across the supply chain. Moreover, by using data to create more transparency and intelligence within supply chains, both food waste and food safety issues can be reduced or mitigated.

Also described herein are devices and systems configured to determine and utilize a score relating to a freshness of a perishable. This type of score is sometimes referred to herein as a "FreshScore." Accordingly, a FreshScore may be assigned to a perishable as a measure of how fresh the perishable is, or, conversely, how close the perishable is to spoilage.

A FreshScore may be generated for a given perishable by using a trained machine learning model(s) to process sensor data received from a sensor that is on or near the perishable during transit of the perishable, in storage, as well as historical data captured for similar products over time. For example, a computing system may receive, during transit of a perishable, sensor data from a sensor that is within a threshold distance of the perishable (e.g., a sensor affixed to a pallet of apples). The received sensor data—which may represent multiple different data points of one or more parameters (e.g., temperature, humidity, etc.) measured by the sensor at multiple different times during the transit of the perishable—can be provided as input to the trained machine learning model(s), which may output a FreshScore relating to the freshness of the perishable. In response to generating the FreshScore, the computing system may perform one or more actions, such as making the FreshScore accessible to users in a similar manner to that described above with respect to the ProofScore. That is, the FreshScore (and potentially other related information) may be associated with an identifier in a database. Thereafter, if a request received from a user computing device includes the identifier for accessing the FreshScore and/or the information related thereto, the computing system may use the identifier to lookup the FreshScore(s) and/or the information and cause the FreshScore, the information, and/or one or more interactive elements (e.g., links, buttons, etc.) for accessing the information to be displayed on a display of the user computing device. By making the FreshScore and related information associated with a perishable accessible to consumers of the perishable, for example, the consumers can be incentivized to pay a higher price for a perishable product that they know more about in terms of its freshness. For example, if the consumer has a choice between buying an apple they know nothing about for a first price, or, for a slightly higher price, buying an apple that they know to be fresh and that they know was transported to the grocery store without deviating from a prescribed temperature range (to preserve its freshness), the consumer is likely to pay the higher price for the apple that they know to be fresh. Any margin collected from the higher price can be distributed to partners of the supply chain as an incentive for providing this transparency into the freshness of the perishable.

Although the above-described ProofScore and FreshScore are provided as example types of scores that may be determined for a given perishable or a "producer" thereof, it is to be appreciated that the devices and systems described herein may be configured to compute other types of scores associated with perishables, and that the scores can be utilized to, among other things, incentivize the supply chain to reduce waste, such as food waste. Accordingly, the techniques, devices, and systems described herein improve existing technologies used in supply chain tracking for reducing waste of perishables, such as food, through the use of incentives. This is because the scores (e.g., ProofScore, FreshScore, etc.) described herein, if relied upon by consumers and enterprises alike, act as a strong incentive for entities involved in the supply chain to improve their scores, which, in turn, helps to reduce waste of perishables. This reduction of perishable waste goes hand-in-hand with reduction of capital waste, especially for perishables like vaccines, or expensive food products (e.g., saffron, truffles, etc.). The techniques, devices, and systems described herein also help enterprises focus on environmental, social, and corporate governance (ESG) issues by providing a record of supply chain data that can be provided to stakeholders, employees, and/or customers alike. In addition, the end consumer can make more informed decisions to purchase perishable products in the marketplace using the techniques, devices, and systems described herein. For instance, a customer at a grocery store can access the ProofScore(s) and/or the FreshScore associated with a perishable for sale at a grocery store, allowing the customer to make an informed decision about purchasing the perishable product. Moreover, enterprises involved in the supply chain can self-assess their performance using the techniques, devices, and systems described herein, allowing them to make adjustments to optimize routes, replace failing equipment, and/or remove poor-performing employees (e.g., delivery drivers) or service providers (e.g., shipping companies) from their workforce.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, mobile telephone devices, tablet computing devices, special-purposed hardware devices, network appliances, and the like. The configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an example supply chain tracking platform 100 including an example computing system 102 configured to determine scores 104 associated with perishables 106 that are transported along a supply chain 108. The perishables 106 are often described herein, by way of example and not limitation, as food, or food products. However, it is to be appreciated that the perishables 106 described herein are not limited to food, despite numerous references thereto. For example, and as mentioned above, a perishable 106 may represent or include, without limitation, food, other ingestible products, vaccines, organs (e.g., human organs, animal organs, etc.), blood, plasma, pharmaceuticals, topical creams, ointments, or the like. In the context of food products, it is to be appreciated that the perishable 106 can be any suitable type of food product, such as a meat product (e.g., beef, pork, poultry, etc.), a seafood product (e.g., salmon, crab, shrimp, etc.), a vegetable product, a fruit product, a dairy product, a beverage product, a grain-based food product (e.g., cereal, snack bars, dog food, etc.), a dessert product (e.g., chocolate), a food ingredient (e.g., flour, sugar, cocoa, etc.), or the like. It is also to be appreciated that a perishable 106 can be in solid form, liquid form (including powders, flours, etc.), gaseous form, or any other suitable form. In FIG. 1, the perishables 106 are depicted as apples for illustrative purposes.

It is to be appreciated that perishables 106 may be transported along a supply chain 108 by rail (e.g., train), road (e.g., truck), ocean (e.g., boat), and/or air (e.g., airplane, drone, etc.). FIG. 1 depicts one example type of supply chain 108. It is to be appreciated that supply chains differ and that one or more of the elements of the example supply chain 108 depicted in FIG. 1 may not be included in other supply chains. For example, some supply chains may not include trucks 112(1), 112(2), or the warehouse 122. In the example supply chain 108 of FIG. 1, a source 110 of the perishables 106 is a farm, the perishables 106 are apples, and the perishables 106 are transported by road from one point to the next along the supply chain 108. In the example of FIG. 1, the perishables 106 may be loaded on a first truck 112(1) at a location of the source 110 and transported to a processor 114 where the perishables 106 may be processed. The perishables 106 may be processed within a facility of the processor 114 in a variety of ways, depending on the type perishable 106. In the case of apples, the apples may be processed by cleaning, de-leafing or de-stemming the apples, sorting and packing the apples, cutting/slicing the apples, cooking the apples, or the like. For these and/or other types of perishables 106, the perishables 106 may be processed at a processor 114 by cutting, grinding, and/or pulverizing the perishable 106, introducing one or more ingredients into the perishable 106 (e.g., mixing the perishable 106 with water, oil, spices, preservatives, etc.), removing one or more ingredients from the perishable 106 (e.g., removing water, caffeine, etc. from the perishable 106), heating (e.g., melting, cooking, etc.) and/or cooling the perishable 106, and the like. In some examples, the processing of the perishable 106 at the processor 114 may include treating the perishable 106 to eliminate, or reduce an amount of, a pathogen(s) within the perishable 106, such as through heat treatment, chemical treatment, pressure treatment, light (e.g., ultraviolet (UV) light) treatment, or any other suitable type of treatment. In some examples, the perishables 106 may be packaged for shipment at the processor 114, such as by packaging the perishables 106 in containers (e.g., boxes) and/or loading the perishables 106 onto pallets that can be more easily moved about an area using machinery, such as forklifts.

The initial leg of the supply chain 108 from the source 110 (sometimes referred to as the "grower" or "producer" within the food industry) to the processor 114 is often referred to as the "first mile" of the supply chain 108. The remainder of the supply chain 108 up to a point where a consumer can purchase the perishable 106 as a product (e.g., at a retail location) is often referred to as the "middle mile" of the supply chain 108. The "last mile" of the supply chain 108 represents the transport of the perishable 106 to the consumer (e.g., delivery of the perishable 106 to the consumer's residence), typically from a retail location.

FIG. 1 illustrates an example where a sensor 116 is associated with the perishables 106 at or near the start of the "middle mile" of the supply chain 108, such as when the perishables 106 are loaded into a second truck 112(2) at a facility of the processor 114. The sensor 116 may be associated with the perishable 106 in various ways, such as by directly affixing the sensor 116 to the perishable 106 itself, by affixing the sensor 116 to a container that is holding/containing the perishable 106, by affixing the sensor 116 to a pallet or another supporting structure that is supporting the perishable 106, or in any other suitable manner. By associating the sensor 116 with the perishable 106, the sensor 116 remains with the perishable 106 (e.g., within a threshold distance of the perishable 106) and, therefore, the sensor 116 travels with the perishable 106 along the remainder of the supply chain 108. It is to be appreciated that the sensor 116 may be associated with the perishable 106 at other times and/or points along the supply chain 108. For example, the sensor 116 may be associated with the perishable 106 at an earlier point in the supply chain 108, such as when the perishable 106 is still located at the source 110 (e.g., just after harvesting the perishable 106), or when the perishable 106 is loaded onto the first truck 112(1) at a location of the source 110, or when the perishable 106 is being processed at the processor 114 or shortly thereafter.

The sensor 116 may be configured to sense one or more parameters, such as temperature, humidity, motion, shock/vibration, light, air pressure, altitude, or the like. Additionally, or alternatively, the sensor 116 may be configured to determine its location (e.g., using a Global Positioning System (GPS) receiver) and/or the time (e.g., the time of day, or any other suitable time-based metric, such as elapsed seconds, minutes, hours, etc. measured from a time of powering on the sensor 116). Accordingly, the sensor 116 may represent or include a location determination component (e.g., a GPS receiver, cell tower triangulation, or location of the nearest Wi-Fi router), a clock/timer, a temperature sensor, a humidity sensor, a gyroscope, a piezoelectric shock sensor, a light sensor, a pressure sensor, and/or an altimeter. In some examples, the sensor 116 represents or includes an image sensor configured to capture images and/or video of its surroundings. For example, the sensor 116 may be configured to capture images of the perishables 106 in transit, which may allow for determining if the perishables 106 have been damaged and/or if the perishables 106 have leaked or are leaking from a container. In some examples, the sensor 116 includes one or more external probes coupled to a main sensor unit, the probe(s) being configured to be placed in an extreme (e.g., very cold or very hot) environment and to communicate data (e.g., temperature data) to the main sensor unit while the main sensor unit remains outside of the extreme environment. For example, a probe(s) of the sensor 116 may be disposed in a freezer containing vaccines to keep the vaccines at a temperature that is below a threshold temperature, and sensor readings can be relayed from the probe to the main sensor unit that is disposed outside of the freezer.

As soon as the sensor 116 is powered on, the sensor 116 may be configured to begin sensing the parameter(s) and sending sensor data 118 associated with the sensed parameter(s) to the remote computing system 102 over a network(s) 120. Accordingly, the sensor 116, in addition to functioning as a sensor, may function as a telemetry device configured to transmit sensor data 118 to other devices (e.g., the computing system 102), such as over the network(s) 120). The network(s) 120 may represent, or include, any type of public or private network, such as a wide-area network, such as the Internet, data and/or voice networks, or the like. In a wireless implementation, the network(s) 120 may include a radio frequency (RF) network, cellular network (e.g., 5G, 4G, 3G, 2G, etc.), satellite network, or the like, which allows the sensors 116 to be mobile, and which allows the sensors 116 to access the network(s) 120 from any available access point (e.g., a cell tower, wireless router, etc.). However, it is to be appreciated that at least part of the network(s) 120 may include a wired infrastructure (e.g., coaxial cable, fiber optic cable, etc.), and/or other connection technologies. In some examples, the sensor 116 is configured to establish an authenticated (e.g., encrypted) session with the computing system 102 over the network(s) 120.

The sensor 116 may be configured to sense the parameter(s) and/or transmit the sensor data 118 at any suitable frequency (e.g., every 30 minutes) and/or in response to events (e.g., in response to establishing a connection to the network(s) 120, in response to sensing a parameter(s), in response to a sensed parameter value(s) deviating from a previously-sensed parameter value(s) by more than a threshold amount, etc.). In an illustrative example, the sensor 116 may be affixed to a pallet of apples at or near the start of the "middle mile" of the supply chain 108 and then powered on, or vice versa. For example, the sensor 116 may be affixed to the perishables 106 and powered on just before, during, or just after a driver loads the perishables 106 into the second truck 112(2) shown in FIG. 1. In response to being powered on, the sensor 116 may begin sensing a parameter(s) (e.g., temperature), and may start sending the sensor data 118 (e.g., temperature data) at any suitable frequency to the remote computing system 102. At a transmission frequency of once every 30 minutes, the sensor 116 may transmit first sensor data 118 at time T1=1:05 PM, second sensor data 118 at time T2=1:35 PM, and so on and so forth for as long as the sensor 116 remains powered on. In some examples, the sensor data 118 (e.g., messages containing the data 118) can be sent in real-time as the sensor data 118 is collected, and/or the sensor data 118 can be held (e.g., buffered) for a period of time and subsequently sent (e.g., periodically) to the computing system 102. For example, the sensor data 118 can be sent by the sensor 116 to the computing system 102 in batches of data at regular intervals, and/or whenever a network connection becomes available to the sensor 116, and/or whenever bandwidth is above a threshold, and/or in response to an event(s) (e.g., in response to collecting a threshold amount of sensor data 118).

The sensor data 118 transmitted by the sensor 116 may include, without limitation, temperature data indicative of a temperature of an environment of the perishable 106 during transit, humidity data indicative of a humidity of the environment of the perishable 106 during transit, tilt data indicative of a tilt of the perishable 106 during transit, vibration data indicative of a vibration of the perishable 106 during transit, light data indicative of an amount of light (e.g., ambient light, artificial light, natural light, etc.) in the environment of the perishable 106 during transit, air pressure data indicative of an air pressure of the environment of the perishable 106 during transit, and/or altitude data indicative of an altitude of the perishable 106 during transit. Additionally, or alternatively, the sensor data 118 may include location data (e.g., latitude, longitude), time data (e.g., a timestamp indicating when the data was collected, as measured by a clock, a timer, or the like), image data, video data, or the like.

As the perishables 106 (and the sensor 116 associated therewith) are transported along the supply chain 108, the sensor data 118 is collected by the computing system 102. For example, the perishables 106 may be transported by the second truck 112(2) (which may include a refer in the back of the truck 112(2) to keep the perishables 106 at a temperature within a prescribed temperature range) to a warehouse 122. The perishables 106 may be stored (e.g., temporarily) at the warehouse 122 before being shipped to a final destination. The warehouse 122 may include temperature-controlled areas (e.g., cold storage/refrigerators/coolers) to store the perishables 106 at a desired temperature. A third truck 112(3) may pick up the perishables 106 (and the sensor 116) from the warehouse 122 and deliver the perishables 106 (and the sensor 116) to a retail location 124. In some examples, the driver of the third truck 112(3), upon arriving at the retail location 124, may open the door to the refer of the truck 112(3), and may power off the sensor 116 just before, during, or just after unloading the perishables 106 at the retail location 124. This point of the supply chain 108—often referred to as the end of the "middle mile" or the start of the "last mile"—may mark the end of the data collection period of the sensor 116, although it is to be appreciated that the sensor 116 can remain with the perishables 106 through at least a portion of the "last mile" of the supply chain 108, in some examples. The retail location 124 may represent a brick-and-mortar store of a retailer (e.g., a grocery store, a restaurant, etc.) that can be visited by consumers (or customers) who may purchase the perishables 106 as products for sale by a retailer. In other examples, the retail location 124 may represent a foodservice distributer, such as Sysco® or Gordon® Food Service.

Turning to the computing system 102 of FIG. 1, the computing system 102 may, in some instances, be part of a network-accessible computing platform that is maintained and accessible via a wide area network. Network-accessible computing platforms such as this may be referred to using terms such as "on-demand computing", "software as a service (SaaS)", "platform computing", "network-accessible platform", "cloud services", "data centers", and so forth. In this manner, the computing system 102 may be configured to provide particular functionality to large numbers of geographically-disparate sensors 116 and/or user computing devices. In general, the computing system 102 may include logic (e.g., software, hardware, and/or firmware, etc.) that is configured to implement the techniques, functionality, and/or operations described herein.

The computing system 102 is configured to receive, via the network(s) 120, the sensor data 118 (e.g., messages containing the sensor data 118) from sensors (e.g., the sensor 116) deployed in the field. The raw sensor data 118 may be stored in a data store accessible to the computing system 102, as depicted in FIG. 1. In addition to the sensor data 118, the computing system 102 may be configured to receive other data, such as custody data 126 indicative of the custody of the perishables 106 along the supply chain 108. For example, custody data 126 may indicate when the perishables 106 changed hands from one custodian (e.g., the processor 114) to another custodian (e.g., the driver of the second truck 112(2)). Any suitable devices and/or technologies may be used to generate such custody data 126, which is collected by the computing system 102 via the network(s) 120. For example, custodians of the perishables 106 may use respective user computing devices (e.g., mobile devices, such as phones) to manually enter custody data 126 (e.g., pickup, drop off, etc.), such as via a mobile application executing on their respective devices. Additionally, or alternatively, geofencing or similar technologies may be used to detect when a tracked perishable 106 leaves or arrives a property (e.g., the property of the processor 114, the warehouse 122, etc.) to trigger a change of custody of the perishable 106. Accordingly, custody data 126 collected by the computing system 102 may indicate who had custody of the perishable 106, times at which the perishable 106 changed hands from an existing custodian to a new custodian, and/or locations of custody. This custody data 126 can be correlated with the sensor data 118 to determine who had custody during particular time ranges, and/or where the custodian(s) had custody of the perishables 106. The sensor data 118 provides a record of the parameter(s) values sensed by the sensor 116 at different times and at different locations throughout the supply chain 108, and the custody data 126 provides a record of the times at which custody of the perishables 106 changed hands, and these records (which may be correlated and combined into a single record) are accessible to the computing system 102.

The computing system 102 is configured to process the sensor data 118 (perhaps in combination with the custody data 126) using one or more models 128 accessible to the computing system 102. For example, the sensor data 118 may be provided as input to a model(s) 128 to determine a score(s) 104 associated with the perishable 106. That is, the computing system 102 may store one or more models 128 that are usable with the scoring algorithms and techniques described herein. Each model 128 may be specific to a type of perishable 106, or the model(s) 128 may be generic models 128 that are agnostic to the type of perishable 106. For example, a model 128 that is used to generate a score 104 (e.g., a FreshScore) relating to a freshness of apples may be different than a model 128 that is used to generate a score 104 (e.g., a FreshScore) relating to a freshness of fish. Meanwhile, a model(s) 128 that is used to compute a score(s) 104 (e.g., a ProofScore(s)) relating to a transparency of information associated with a perishable 106 may be the same model(s) 128 used for multiple different types of perishables 106.

In some examples, the model(s) 128 may represent, or include, a mathematical model(s) that define(s) one or more equations, variables, and/or weights that are usable for determining a score(s) 104 associated with the perishable 106. An example of such a mathematical model(s) 128(1) is described in more detail with reference to FIG. 2. In some examples, the model(s) 128 may represent, a machine learning model(s). Machine learning generally involves processing a set of examples (called "training data") in order to train a machine learning model(s). A machine learning model(s), once trained, is a learned mechanism that can receive new data as input and estimate or predict a result as output. For example, a trained machine learning model can be a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input. In the context of the present disclosure, the unknown input may include the sensor data 118 associated with a perishable 106 transported along the supply chain 108, and the trained machine learning model(s) 128(2) may be tasked with generating a score 104. For example, the trained machine learning model(s) 128(2) may be configured to output a classification or a score that indicates, or otherwise relates to, a freshness of the perishable 106. An example of such a trained machine learning model(s) 128(2) is described in more detail with reference to FIG. 3.

The score(s) 104 may be generated at any suitable time and/or at any suitable frequency. In some examples, a score(s) 104 associated with the perishable 106 is generated after the perishable 106 has been transported along the supply chain 108 (e.g., after arrival of the perishable 106 at the retail location 124). That is, a score(s) 104 may be generated after a complete set of sensor data 118 has been collected in association with the shipment of the perishable 106 from the source 110 to a consumer of the perishable 106 (e.g., to the retail location 124 where consumers can purchase the perishable 106 as a product). In other examples, a score(s) 104 associated with the perishable 106 is generated dynamically or in real-time during transit of the perishable 106 along the supply chain 108. For example, a score(s) 104 may be generated for a perishable 106 as sensor data 118 is received from a sensor 116 associated with the perishable 106, and/or after a threshold amount of sensor data 118 is received from the sensor 116, but before the perishable 106 (and the sensor 116) has arrived at its final destination (e.g., the retail location 124).

In some examples, the scores 104 determined by the computing system 102 can be used to classify the perishable 106 as one of multiple class labels indicative of an attribute (e.g., a freshness) of the perishable 106, and the class label may be stored in association with the score(s) 104 for the perishable 106 or with any other suitable data. A binary "fresh or spoiled" classification of a perishable 106 may be based on whether the FreshScore 104(2) satisfies a threshold. "Satisfying" a threshold, as used herein can mean meeting or exceeding the threshold, or strictly exceeding the threshold. For example, a threshold of 50 (on a scale of 0 to 100) may be satisfied by a score 104 of 50, because 50 is equal to the threshold in this example. Alternatively, a threshold of 50 may be satisfied by a score 104 of 51, while a score 104 of 50 may not satisfy the threshold.

Over time, it can be appreciated that a large amount of sensor data 118 and custody data 126 can be collected as perishables 106 (and associated sensors 116) are transported along supply chains 108. This data is thereafter accessible to the computing system 102 and to users, and can be used in various ways, as described herein. In some examples, computing system 102 may be configured to generate reports, which may be sent to one or more users automatically and/or at the request of the user. FIG. 1 depicts an administrator (admin) dashboard 130, a partner dashboard 132, and user devices 134, which may be used by users (e.g., users 140) to access the computing system 102 and/or data and/or information provided by the computing system 102. FIG. 1 depicts a network(s) 136 that can be utilized by the admin dashboard 130 and/or the partner dashboard 132, and another network(s) 138 that can be utilized by the user devices 134. These networks 136, 138 may be the same as or similar to the network(s) 120 described herein. In some examples, however, the network(s) 136 represent(s) a private blockchain, while the network(s) 138 represent(s) a public blockchain.

The admin dashboard 130, the partner dashboard 132, and the user devices 134 may represent any suitable type and/or any number of computing devices including a personal computer (PC), a laptop computer, a desktop computer, a mobile phone, tablet computer, a server computer, a wearable computer (e.g., a smart watch, headset, smart glasses, etc.), or any other electronic device that can transmit data to, and receive data from, other devices, such as the computing system 102. In the example of FIG. 1, a user of the admin dashboard 130 may analyze the scores 104 and/or other information related thereto, adjust algorithms, user interfaces, and/or select what information is presented to other users 140 (e.g., consumers) and how it is presented. Users of the partner dashboard 132 (e.g., partners or other entities involved in the supply chain 108, such as an entity associated with the source 110, the processor 114, carriers who employ delivery drivers, etc.) may monitor the provenance and/or condition of their shipments en route, may receive condition alerts, and/or may assess their performance based on the scores 104 and related information (e.g., analytics information) accessible via the partner dashboard 132 to make adjustments to their own internal processes, such as optimizing routes for transporting perishables 106, replacing equipment, removing poor-performing personnel from their ranks, etc. This can help partners of the supply chain 108 to reduce waste and/or risk with respect to their shipments, and it reinforces good behavior. The users 140 depicted in FIG. 1 represent the general public, such as consumers of the perishables 106 sold as products in the marketplace. As will be described in more detail below, the users 140 may utilize their user devices 134 to interact with elements at the retail location 124, which provide access to the scores 104 and related information associated with perishables 106 for sale to the users 140 as consumers.

Figure 2:
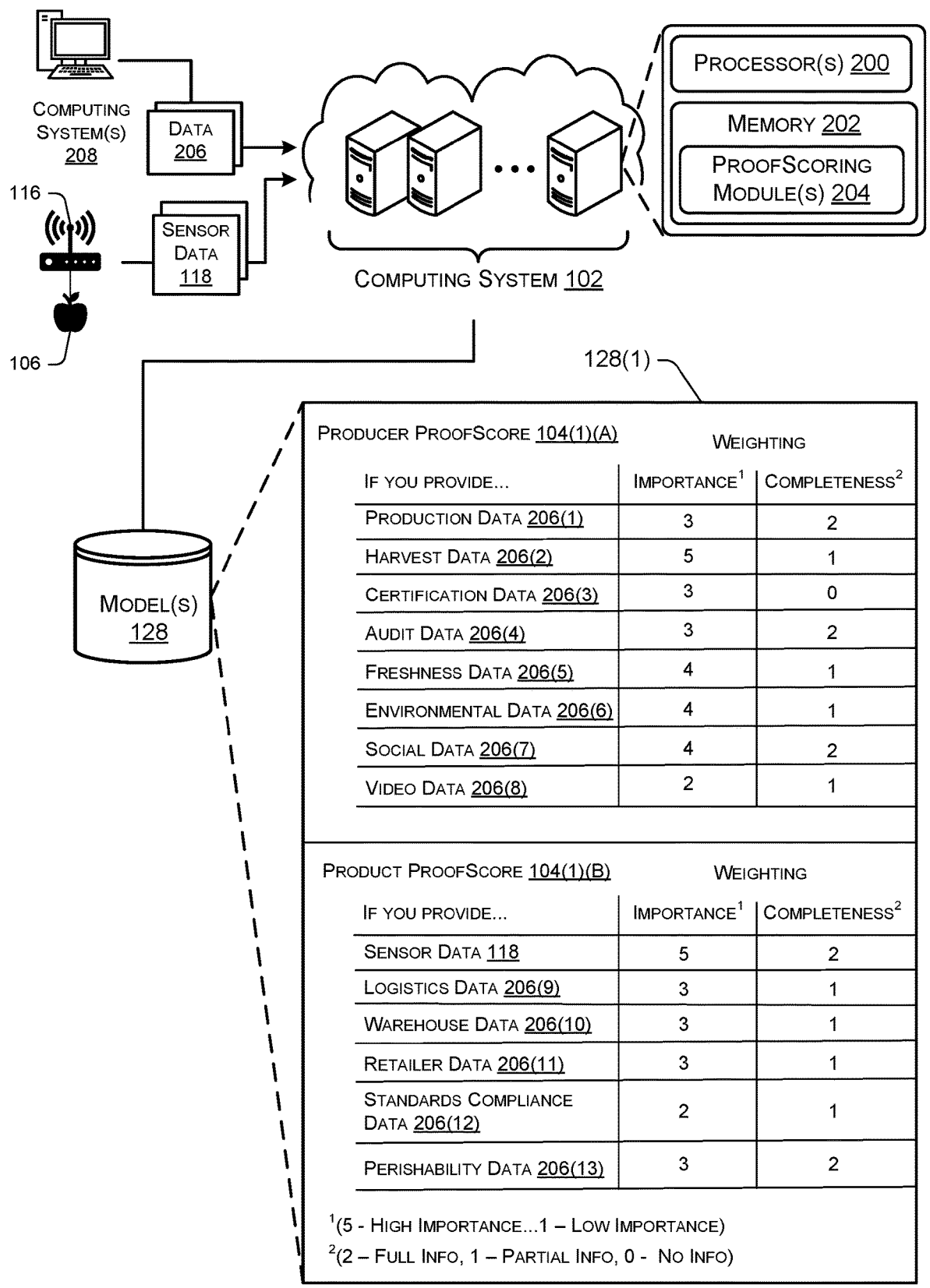
FIG. 2 illustrates that the computing system of FIG. 1 is configured to determine a score(s) relating to a transparency of information associated with a perishable.

FIG. 2 illustrates that the computing system 102 of FIG. 1 is configured to determine a score(s) 104 relating to a transparency of information associated with a perishable 106. In the illustrated implementation, the computing system 102 includes one or more processors 200 and memory 202 (e.g., computer-readable media 202). In some implementations, the processors(s) 200 may include a central processing unit (CPU)(s), a graphics processing unit (GPU)(s), both CPU(s) and GPU(s), a microprocessor, a digital signal processor or other processing units or components known in the art. Alternatively, or in addition, the functionally described herein can be performed, at least in part, by one or more hardware logic components. For example, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 200 may possess its own local memory, which also may store program modules, program data, and/or one or more operating systems.

The memory 202 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disk (CD)-ROM, digital versatile disks (DVD) or other optical storage, magnetic cassettes, magnetic tape, magnetic disk storage or other magnetic storage devices, redundant array of inexpensive disks (RAID) storage systems, or any other medium which can be used to store the desired information and which can be accessed by a computing device. The memory 202 may be implemented as computer-readable storage media (CRSM), which may be any available physical media accessible by the processor(s) 200 to execute instructions stored on the memory 202. In one basic implementation, CRSM may include RAM and Flash memory. In other implementations, CRSM may include, but is not limited to, ROM, EEPROM, or any other tangible medium which can be used to store the desired information and which can be accessed by the processor(s) 200. The memory 202, for example, can include various modules, such as instructions, datastores, and so forth, which may be configured to execute on the processor(s) 200 for carrying out the techniques, functionality, and/or operations described herein. An example functional module(s) in the form of a ProofScoring module(s) 204 is shown in FIG. 2.

As illustrated in FIG. 2, the computing system 102 may receive (e.g., collect) data from various sources. For example, and as described above with reference to FIG. 1, the computing system 102 may collect the sensor data 118 from one or more sensors 106 associated with perishables 106 transported along a supply chain 108. Additionally, or alternatively, the computing system 102 may receive, from one or more other computing systems 208, data 206 associated with a perishable 106. For example, partners or entities associated with the supply chain 108 (e.g., the source 110, a carrier who employs delivery personnel, the processor 114, an entity associated with the warehouse 122, etc.) may provide the data 206 using their own computing system(s) 208. This data 206 is shared voluntarily by such entities and it can be a basis for computing the ProofScore(s) described herein.

In some examples, the data 206 represents data 206 about a "producer" of the perishable 106, which is usable to compute a producer ProofScore 104(1)(A). As used herein, the term "producer" in "producer ProofScore 104(1)(A)" can refer to any suitable entity associated with the supply chain 108 for the perishable 106 in question, such as an entity associated with the source 110 (e.g., a farmer, a grower, a manufacturer), a processor 114, a distributor who owns and/or operates a warehouse 122 involved in the supply chain 108, a carrier who employs couriers to transport the perishable 106 along the supply chain 108, or the like. In some examples, the data 206 may include production data 206(1), harvest data 206(2), certification data 206(3), audit data 206(4), freshness data 206(5), environmental data 206(6), social data 206(7), video data 206(8), logistics data 206(9), warehouse data 206(10), retailer data 206(11), standards compliance data 206(12), and/or perishability data 206(13). These different types of data 206 about the producer of the perishable 106 are discussed in turn.

Production data 206(1) may include, without limitation, data about the soil and/or the fertilizer used to grow the perishable 106, data about whether the perishable 106 is or includes a genetically modified organism (GMO), whether the producer grew the perishable 106 organically, data about the quantity of water used to grow the perishable 106, or the like. Harvest data 206(2) may include, without limitation, data about when (e.g., day, time, month, season, year, etc.) the perishable 106 was harvested, where (e.g., a geographical location or region, a general type of area or habitat, etc.) the perishable 106 was harvested, how (e.g., the tools, procedure, etc. involved) the perishable 106 was harvested, a volume of the perishable 106 harvested during a single harvest or over multiple harvests, any pre-processing involving the perishable 106, and/or the conditions (e.g., environmental conditions, such as weather, etc.) in which the perishable 106 was harvested. Certification data 206(3) may include, without limitation, data about whether the producer has complied with certifications, such as fair trade certifications, organic certifications, natural growth certifications, rainforest alliance certifications, or the like. Audit data 206(4) may include, without limitation, data about whether the producer has been audited and the results of the audit. Freshness data 206(5) may include, without limitation, FreshScores generated by the computing system 102 in association with the perishables 106 produced by the producer and/or other data relating to the freshness of the producer's perishables 106. Environmental data 206(6) may include, without limitation, data about whether the producer uses renewable energy and/or water conservation technologies to produce the perishable 106, which, in some examples, can be computed as an environmental score for the producer based on the producer's efforts to be an environmentally-friendly producer. Social data 206(7) may include, without limitation, data about whether the producer provides information on a social media platform, such as by posting information to followers of an official social media account(s) of the producer. In some examples, a social score can be computed for the producer based on the producer's visibility and/or presence and/or activity on a social media platform. Video data 206(8) may include, without limitation, "storytelling" videos that have been uploaded by the producer to the computing system 102 or to another platform (e.g., the producer's own website), which may provide information about how the perishable 106 was produced. Logistics data 206(9) may include, without limitation, data provided by entities involved in the logistics of transporting perishables 106 along supply chains 108, such as carriers, which may indicate modes of transportation used to transport the perishables 106, equipment used to maintain the perishables 106 at within prescribed temperature ranges and/or other "freshness" parameters, or the like. Warehouse data 206(10) may include, without limitation, data provided by warehouses 122 and/or distribution centers involved in the supply chains 108 of perishables 106, which may indicate storage conditions (e.g., temperature, chemicals and/or procedures used for sanitizing storage spaces, etc.) at the warehouses 122. Retailer data 206(11) may include, without limitation, data provided by retailers and/or food service entities, which may indicate storage conditions in storage rooms of a retail location 124, methods of cleaning and/or preparing perishables 106 for display to consumers, etc. Standards compliance data 206(12) may include, without limitation, data about whether the perishable 106 has complied with standards, such as GS1 standards, food safety standards imposed by a regulatory body (e.g., the Food and Drug Administration (FDA) in the United States), or the like. Perishability data 206(13) may include, without limitation, data about perishability of the perishable 106 in terms of transparency, such as the transparency of information regarding an average time period over which the perishable 106 will remain fresh at room temperature, and/or recommended temperature range(s) at which the perishable 106 is to be stored for preserving freshness longer. In some examples, the data 206 may be received via application programming interfaces (APIs) that hook into the computing system(s) 208 of partners or entities associated with the supply chain 108. The data 206 can be stored by the computing system 102 in a secure infrastructure that follows General Data Protection Regulation (GDPR) compliance.

With this data 206, the ProofScoring module(s) 204 may use some or all of the received data 206 with a model 128(1) of weights to compute a producer ProofScore 104(1)(A) relating to the transparency of information about the "producer" of the perishable 106. In some examples, the producer ProofScore 104(1)(A) may be determined based on at least two factors (or weights): (i) importance, and (ii)

completeness. In one example, the importance scale may range from 5—High Importance to 1—Low Importance. As its name implies, the importance factor (or weight) is indicative of an importance of the data 206. Thus, each type of data 206(1) through 206(8) may be assigned a respective weight indicative of the importance of the data 206. FIG. 2 illustrates an example where the harvest data 206(2) is assigned an importance weight of 5, the video data 206(8) is assigned an importance weight of 2, and the other types of data 206(1), 206(3)-(7) are assigned respective importance weights of 3 or 4. This indicates that the harvest data 206(2) is the most important data, and the video data 206(8) is the least important data. However, this is merely an example, and it is to be appreciated that these importance weights are configurable.

In one example, the completeness scale may range from 2—Full information, 1—Partial Information, to 0—No information. As its name implies, the completeness factor (or weight) is indicative of a completeness of the data 206. Thus, each type of data 206(1) through 206(8) may be assigned a respective weight indicative of the completeness of the data 206. While the importance factor (or weight) may be determined before the receipt of the data 206, the completeness factor (or weight) is determined after the receipt of the data 206 by evaluating the completeness of the data 206 received. For example, sub-categories may be defined for each type of data 206(1) through 206(8), and if the received data 206 includes all sub-categories defined for the type of data 206, a maximum completeness weight (e.g., a completeness weight of 2 on a scale of 0 to 2) may be assigned to that particular type of data 206. In an illustrative examples, sub-categories of particular certifications may be defined for the certification data 206(3), and if the certification data 206(3) received by the computing system 102 includes all of those certification sub-categories, the maximum completeness weight may be assigned to the certification data 206(3), whereas a lower completeness weight may be assigned to the certification data 206(3) if one or more of the certification sub-categories are missing (e.g., not received). FIG. 2 illustrates an example where a minimum completeness weight (e.g., a completeness weight of 0 on a scale of 0 to 2) was assigned to the certification data 206(3), which means that a producer may have not provided any certification data 206(3), and, therefore, the computing system 102 did not receive any certification data 206(3) for the producer in question.

The ProofScoring module(s) 204 may use the importance weights and the completeness weights to determine the producer ProofScore 104(1)(A). For example, a sub score may be determined (e.g., calculated) for each type of data 206(1) through 206(8) based on the importance weight and the completeness weight assigned to the respective types of data 206. For example, the importance weight may be multiplied by the completeness weight to obtain a sub score for a particular type of data 206. In the example of FIG. 2, a first sub score determined for the production data 206(1) may be a sub score of 6 (3×2), a second sub score determined for the harvest data 206(2) may be a sub score of 5 (5×1), a third sub score determined for the certification data 206(3) may be a sub score of 0 (3×0), a fourth sub score determined for the audit data 206(4) may be a sub score of 6 (3×2), a fifth sub score determined for the freshness data 206(5) may be a sub score of 4 (4×1), a sixth sub score determined for the environmental data 206(6) may be a sub score of 4 (4×1), a seventh sub score determined for the social data 206(7) may be a sub score of 8 (4×2), and an eighth sub score determined for the video data 206(8) may be a sub score of 2 (2×1). These are merely example weights and sub scores to illustrate one example way of using the weights to determine the producer ProofScore 104(1)(A) based on the computed sub scores. It is also to be appreciated that other mathematical operations besides multiplication and/or other statistical metrics may be calculated to determine the producer ProofScore 104(1)(A). In general, the producer ProofScore 104(1)(A) provides transparency, data accessibility, collaboration, risk mitigation, and trustworthiness across customers/consumers and partners of the supply chain 108, and it can be used for ranking producer transparency within the food industry. It can be appreciated that the producer ProofScore 104(1)(A) computation is based in part on the amount of information or data (measured by the completeness factor (or weight)) that an entity(ies) of the supply chain 108 is/are willing to provide/share, and that the more information or data provided, the higher the producer ProofScore 104(1)(A). Thus, the producer ProofScore 104(1)(A) is a measure of the transparency of information about the producer of the perishable 106.

As shown in FIG. 2, the ProofScoring module(s) 204 may use some or all of the received data 206 to compute a product ProofScore 104(1)(B) relating to the transparency of information about the perishable 106 itself. The product ProofScore 104(1)(B) may be computed in addition to, or in lieu of, the producer ProofScore 104(1)(A). In some examples, the product ProofScore 104(1)(B) may be determined based on at least the same two factors (or weights) used to determine the producer ProofScore 104(1)(A): (i) importance, and (ii) completeness. Thus, the sensor data 118, and each type of data 206(9) through 206(13) may be assigned a respective weight indicative of the importance of the data 118, 206, as well as a respective weight indicative of the completeness of the data 118, 206. FIG. 2 illustrates an example where a maximum completeness weight (e.g., a completeness weight of 2 on a scale of 0 to 2) was assigned to both the sensor data 118 and the perishability data 206(13), which means that the computing system 102 collected a complete set of sensor data 118 from the sensor 116 associated with the perishable 106 as the perishable 106 was transported along the supply chain 108, and that the producer provided a full information about perishability of the perishable 106.

The ProofScoring module(s) 204 may use the importance weights and the completeness weights to determine the product ProofScore 104(1)(B). For example, a sub score may be determined (e.g., calculated) for the sensor data 118 and for each type of data 206(9) through 206(13) based on the importance weight and the completeness weight assigned to the respective types of data 206 and to the sensor data 118. In the example of FIG. 2, a first sub score determined for the sensor data 118 may be a sub score of 10 (5×2), a second sub score determined for the logistics data 206(9) may be a sub score of 3 (3×1), a third sub score determined for the warehouse data 206(10) may be a sub score of 3 (3×1), a fourth sub score determined for the retailer data 206(11) may be a sub score of 3 (3×1), a fifth sub score determined for the standards compliance data 206(12) may be a sub score of 2 (2×1), and a sixth sub score determined for the perishability data 206(13) may be a sub score of 6 (3×2). Again, these are merely examples weights to illustrate one example way of using the weights to determine the product ProofScore 104(1)(B). It is also to be appreciated that other mathematical operations besides multiplication and/or other statistical metrics may be calculated to determine the product ProofScore 104(1)(B). In general, the product ProofScore 104(1)(B) provides transparency, data accessibility, collaboration, risk mitigation, and promotes trustworthiness across customers/consumers and partners of the supply chain 108, and it can be used for ranking product transparency within the food industry. It can be appreciated that the product ProofScore 104(1)(B) computation is based in part on the amount of information or data (measured by the completeness factor (or weight)) that an entity(ies) of the supply chain 108 is/are willing to provide/share, and that the more information or data provided, the higher the product ProofScore 104(1)(B). Thus, the product ProofScore 104(1)(B) is a measure of the transparency of information ab out the perishable 106.

Figure 3:
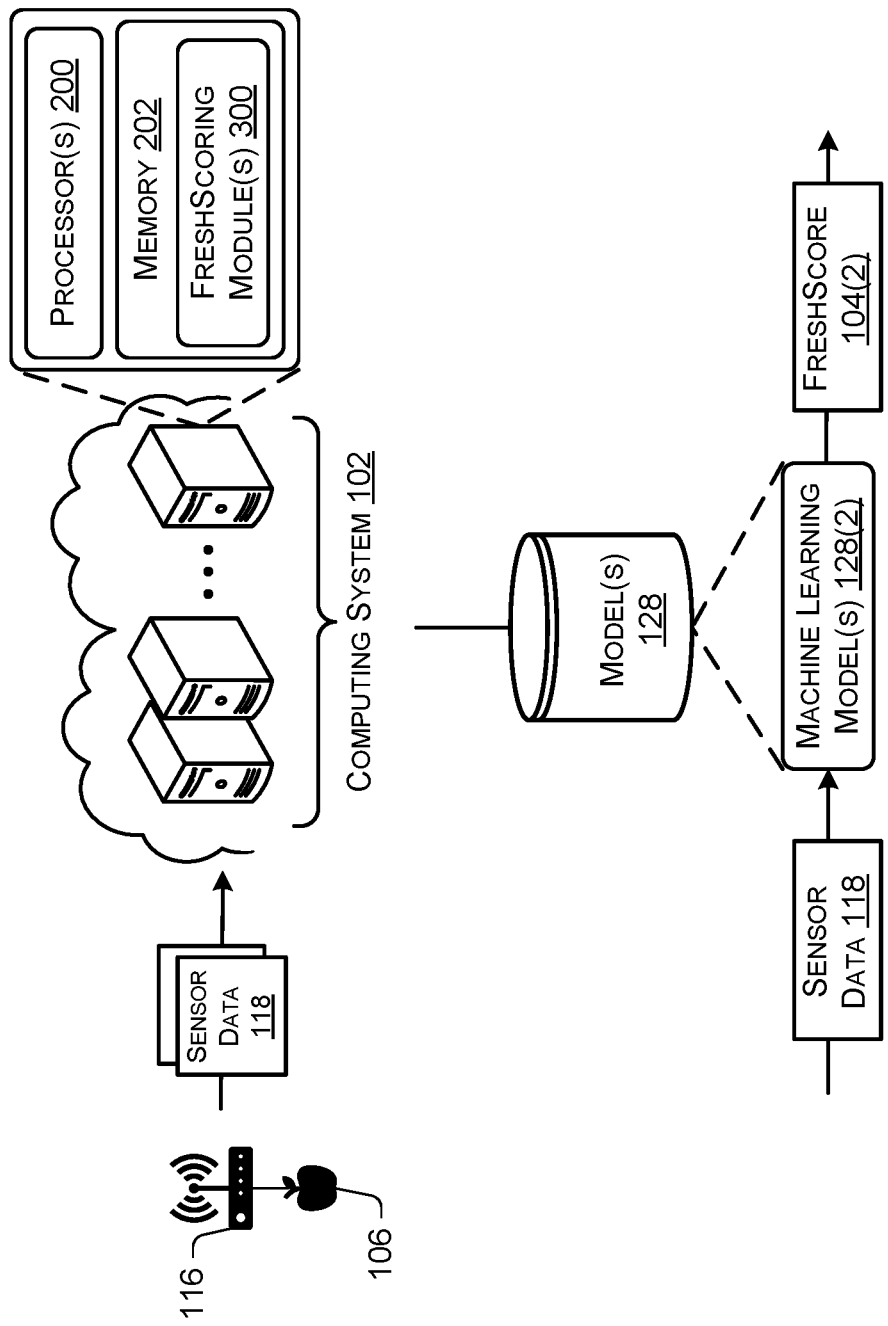
FIG. 3 illustrates that the computing system of FIG. 1 is configured to determine a score(s) relating to a freshness of a perishable.

FIG. 3 illustrates that the computing system 102 of FIG. 1 is configured to determine a score(s) 104 (e.g., a FreshScore 104(2)) relating to a freshness of a perishable 106. For example, a functional module(s) in the form of a FreshScoring module(s) 300 may be stored in the memory 202 of the computing system 102, as shown in FIG. 3. This FreshScoring module(s) 300 may utilize the sensor data 118 in conjunction with a trained machine learning model(s) 128(2) for generating the FreshScore(s) 104(2). The trained machine learning model(s) 128(2) may represent a single model or an ensemble of base-level machine learning models, and may be implemented as any type of machine learning model. For example, suitable machine learning models for use by the techniques and systems described herein include neural networks (e.g., deep neural networks (DNNs), recurrent neural networks (RNNs), etc.), tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can include a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

Historical data associated with past shipments of perishables (e.g., a sampled subset of historical sensor data 118 and/or custody data 126 accessible to the computing system 102) can be used as training data to train a machine learning model(s) to obtain the trained machine learning model(s) 128(2). In general, training data for machine learning can include two components: features and labels. However, the training data used to train the machine learning model(s) 128(2) may be unlabeled, in some embodiments. Accordingly, the machine learning model(s) 128(2) may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. In some examples, a training data set may include a number of shipments, as well as average, minimum, and maximum values associated with temperature, shipment distance, and/or shipment time with respect to past shipments of a perishable 106. In some examples, a training data set may be parsed into different categories, such as packing data, transit data, and unpacking data. In some examples, a clustering model is used with an unsupervised machine learning algorithm to cluster the training data set into these multiple clusters so that shipments with similar temperature patterns are grouped together. For example, a K-Medoids Algorithm can be used to group the training data set into a specified number of clusters (e.g., three clusters) based on minimizing the sum of dissimilarities between shipments within each cluster and the shipment designated as the center of that cluster. In some examples, multinomial logistic regression can be used to predict the probability that a given shipment belongs to one of the clusters. Packing data (or a packing cluster) may represent or include sensor 116 readings taken when a truck is stationary and being packed and possibly the first couple or few hours of the truck's trip, during which the temperature of the perishable 106 is settling (e.g., increasing or decreasing) towards a desired temperature. The packing data set may include light sensor values greater than zero, distance travelled since the last sensor 116 reading of less than one mile, sensor 116 timestamp dated before the middle transit timestamp, a couple of hours or more of sensor 116 readings from the beginning of the transportation period, where the light value is zero and the shipment is moving. Transit data (or a transit cluster) may represent or include sensor 116 readings taken when a truck is moving, excluding the first couple or few hours of the trip. The transit data set may include light sensor values of zero, distance travelled since the last sensor 116 reading of greater than one mile, and a couple of hours or less of sensor 116 readings from the beginning of the transportation period, where the light value is zero and the shipment is moving. Unpacking data (or an unpacking cluster) may represent or include sensor 116 readings taken up to one hour after the truck is stationary and has reached its destination. The unpacking data set may include light sensor values of zero, and sensor 116 readings up to one hour after the shipment has reached its final destination (e.g., latitude, longitude).

In some examples, the training data set may be "cleansed," such as by replacing missing sensor data 118 (e.g., temperature data, light data, etc.) with data from adjacent (e.g., the previous or the next) sensor 116 readings, and/or by using a logarithm of the sensor 116 readings (e.g., temperature readings) for modeling in order to address the presence of outliers. In some examples, dynamic time warping is used on the training data set to allow sensor data 118 from a set of shipments to be comparable despite the difference in their number of data points (e.g., the time series data may be of varying lengths across past shipments, depending on the number of transmissions from the sensors 116 and travel time). In some examples, data in the training data set is resampled at increments (e.g., 5-minute increments) before training the machine learning model(s) 128(2).

As shown in FIG. 3, the FreshScoring module(s) 300 is configured to provide the sensor data 118 received from a sensor 116 associated with a perishable 106 as input to the trained machine learning model(s) 128(2), and to generate a score 104(2) (e.g., a FreshScore 104(2) associated with the perishable 106 as output from the trained machine learning model(s) 128(2). This FreshScore 104(2) relates to a freshness of the perishable 106. In some examples, FreshScore 104(2) can be used to classify the perishable 106 as one of multiple class labels indicative of an attribute (e.g., a freshness) of the perishable 106, and the class label may be stored in association with the score(s) 104 for the perishable 106 or with any other suitable data. For example, a binary "fresh or spoiled" classification of a perishable 106 may be based on whether the FreshScore satisfies a threshold. Accordingly, the trained machine learning model(s) 128(2) is a learned mechanism that can predict the freshness of a perishable 106 based on sensor data 118, which may exhibit patterns (e.g., temperature profiles, humidity profiles, etc.) associated with fresh or spoiled perishables. For example, the trained machine learning model(s) 128(2) may learn to predict that a perishable 106 is fresh if it deviates from a prescribed temperature range less than a threshold number of times and/or for less than a threshold amount of time, and it may penalize a given perishable 106 by ascribing a lower FreshScore 104(2) if the temperature profile exhibits frequent and/or lengthy deviations from a prescribed temperature range.

Figure 4:
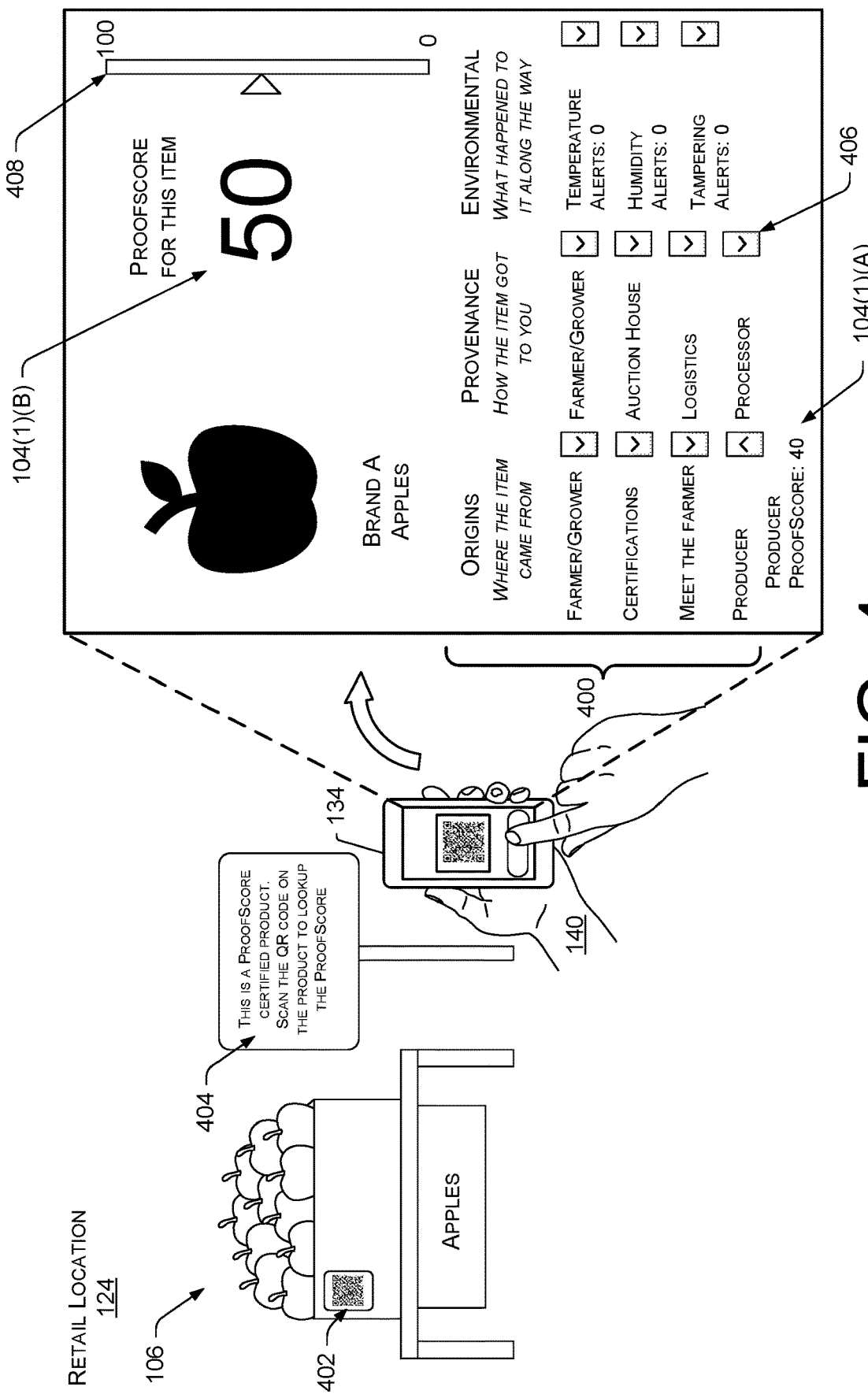
FIG. 4 illustrates a user at a retail location who is using a computing device to access a ProofScore®(s) and related information associated with a perishable.

FIG. 4 illustrates a user 140 at a retail location 124 who is using a computing device 134 to access a ProofScore(s) 104(1) and related information 400 associated with a perishable 106 at the retail location 124. As described above, the computing system 102 may determine scores 104 associated with perishables 106, such as the ProofScore(s) 104(1)(A), 104(1)(B), and after generating the scores 104. After generating these scores 104, an identifier may be associated with each score 104 and with other related information 400. This identifier can be linked with an element 402 that is accessible to users 140 at the retail location 124. The element 402, linked to a particular identifier, can then be used to lookup (or otherwise access) the score(s) 104 and/or related information 400 associated with the identifier. In the example of FIG. 4, the element 402 is a Quick Response (QR) code that a user 140 can interact with by using his/her computing device 134. For example, the user 140 may have downloaded a client application onto the computing device 134, which is configured to read or scan the element (e.g., QR code) and lookup the score(s) 104 and/or information 400 related to the perishable 106. Personnel at the retail location 124 may associate the element 402 with the perishable 106 in various ways. For example, the element 402 can be affixed to the perishable 106 itself (e.g., a sticker with a code printed on the sticker), to a package containing the perishable 106, and/or the element 402 may be on a sign or a display that is near the perishable 106. In the example of FIG. 4, the element 402 (e.g., QR code) is on a box of apples (an example perishable 106). A sign next to the perishable 106 also includes a message 404 that reads: "This is a ProofScore certified product. Scan the QR code on the product to lookup the ProofScore." This message 404 makes the user 140 aware of the availability of the ProofScore(s) 104(1) and related information 400 that can be accessed using his/her computing device 134.

Although the element 402 is shown as a QR code in the example of FIG. 4, it is to be appreciated that the element 402 can take other forms, such as a radio frequency identification (RFID) tag, a near field communication (NFC) transmitter, or a picture that can be captured with a camera and analyzed using image analysis, or the like. Additionally, or alternatively, it is to be appreciated that a user 140 may open a client application or navigate to a website on a browser and enter information (e.g., an alphanumeric code, numeric code, or the like) displayed on or near the perishable 106 at the retail location. As yet another example, the user 140 might wear smart glasses or a headset with a camera that automatically scans the element 402 and displays the score(s) 104 and/or interactive element(s) 406 to access the information 400 on a display of the smart glasses or headset to provide an augmented reality (AR) experience at the retail location 124. In any case, in response to the user 140 entering information and/or in response to the computing device 134 interacting with (e.g., scanning) the element 402 at the retail location 124, the computing device 134 may send, and the remote computing system 102 may receive, a request to access the score(s) 104 and/or information 400 associated with the perishable 106, the request including the identifier linked to the element 402 or to the information entered by the user 140. In response to receiving the request, the computing system 102 may cause the score(s) 104 and/or one or more interactive elements 406 (e.g., links, buttons, drop down elements, etc.) for accessing the information 400 to be displayed on a display of the computing device 134, such as by serving the information to the computing device 134 and causing a user interface to display the information.

FIG. 4 illustrates an example of what can be displayed on the display of the computing device 134 in response to the request sent by the computing device 134 to the remote computing system 102. For example, a product ProofScore 104(1)(B) associated with the perishable 106 can be displayed on the display of the computing device 134. In some examples, the product ProofScore 104(1)(B) can be displayed relative to a scale 408 having a minimum score and a maximum score. In the example of FIG. 4, the producer ProofScore 104(1)(B) of 50 indicates that the score is in the middle of the scale 408. Additionally, or alternatively, the product ProofScore 104(1)(B) can be displayed as a color-coded score, wherein a color of the color-coded score is indicative of the transparency of information about the perishable. For example, a green-colored score may be indicative of a good/high score, and a red-colored score may be indicative of a bad/low score. In some examples, more than two colors may be used in a color-coding scheme, such as a yellow-colored score indicating a mediocre/average score. In addition to the product ProofScore 104(1)(B), FIG. 4 also illustrates that a producer ProofScore 104(1)(A) may be displayed on the computing device 134 of the user 140. This may be displayed in a similar manner to that of the producer ProofScore 104(1)(B) or in a different manner.

As shown in the example of FIG. 4, interactive elements 406 in the form of drop down menu elements can be displayed on the computing device 134 and interacted with (e.g., selected) to reveal information 400 associated with the perishable 106, such as information about the perishable 106 itself, information about a producer of the perishable 106, or the like. In FIG. 4, the information 400 includes origin information indicating where the perishable 106 came from, provenance information indicating how the perishable 106 arrived at the retail location 124, and environmental information indicating what happened to the perishable 106 along the way to the retail location 124. The user 140 can explore this information to learn about the perishable 106 in order to make an informed decision about purchasing the perishable 106. The retailer may offer perishables 106 that have been scored to consumers for a higher price than perishables 106 that have not been scored in the manner described herein. In this way, a consumer can choose to buy a perishable 106 that they know where it came from, how it got there, and what happened to it along the way for a premium, and the extra money charged to the consumer can trickle back to the entities who shared their data 206. This profit sharing system incentivizes such entities to be more transparent about the perishables 106 they are transporting along supply chains 108. This, in turn, helps to reduce waste, such as food waste, because there is more visibility into the supply chain 108 of the perishable 106 and there is an incentive for entities to drive up their scores 104.

Figure 5:
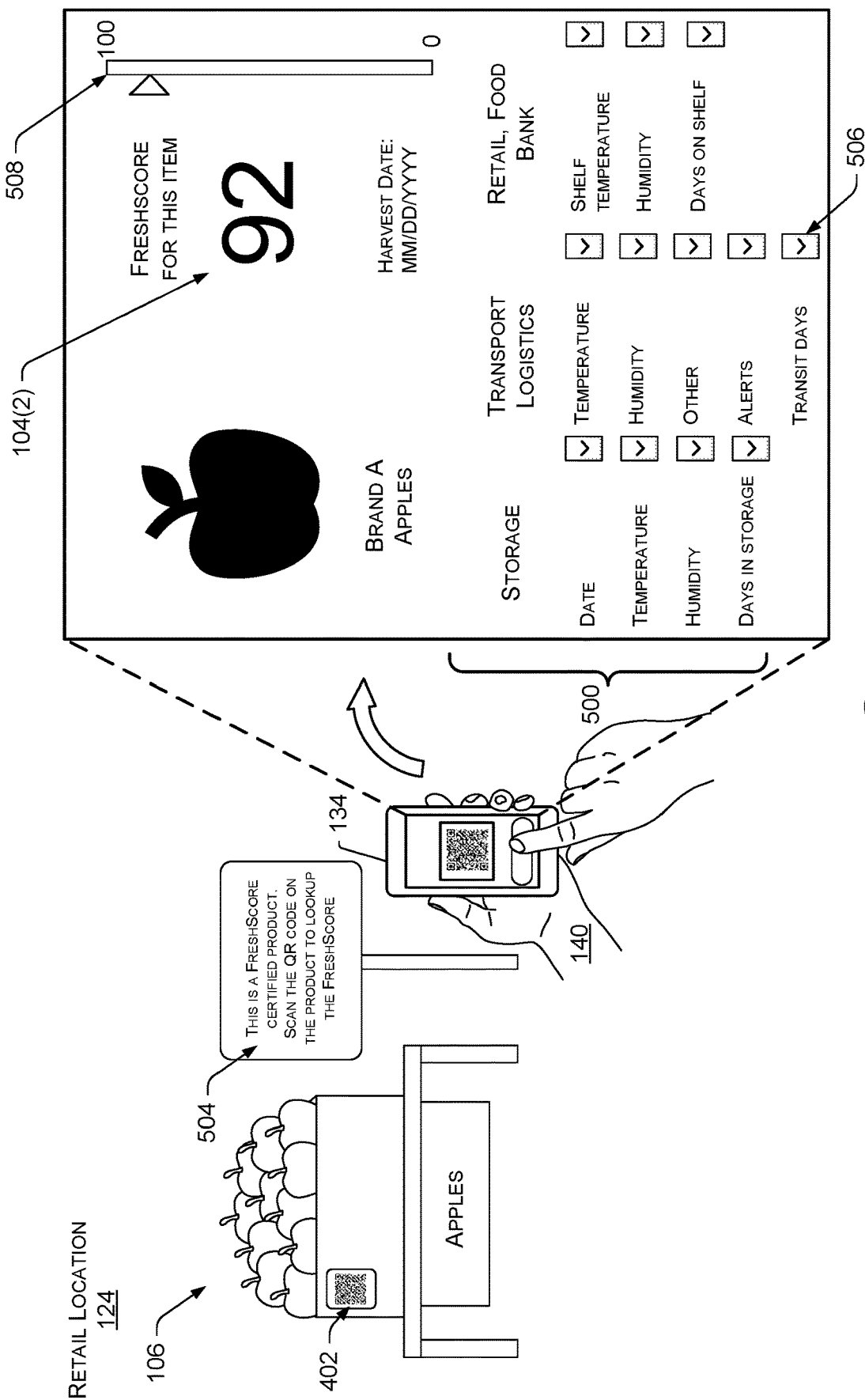
FIG. 5 illustrates a user at a retail location who is using a computing device to access a FreshScore(s) and related information associated with a perishable.

FIG. 5 illustrates a user 140 at a retail location 124 who is using a computing device 134 to access a FreshScore(s)

104(2) and related information 500 associated with a perishable 106 at the retail location 124. As described above, the computing system 102 may also, or alternatively, determine FreshScores 104(2) associated with perishables 106. Accordingly, an identifier may be associated with each FreshScore 104(2) and with other related information 500 and linked to an element 402, similar to that described above with respect to the ProofScores 104(1). In some examples, the information 500 may be displayed in conjunction with the FreshScore 104(2). In the example of FIG. 5, the element 402 (e.g., QR code) is on a box of apples (an example perishable 106). A sign next to the perishable 106 also includes a message 504 that reads: "This is a FreshScore certified product. Scan the QR code on the product to lookup the FreshScore." This message 504 makes the user 140 aware of the availability of the FreshScore(s) 104(2) and related information 500 that can be accessed using his/her computing device 134.

Accordingly, in response to the user 140 entering information and/or in response to the computing device 134 interacting with (e.g., scanning) the element 402 at the retail location 124, the computing device 134 may send, and the remote computing system 102 may receive, a request to access the score(s) 104 and/or information 500 associated with the perishable 106, the request including the identifier linked to the element 402 or to the information entered by the user 140. In response to receiving the request, the computing system 102 may cause the score(s) 104 and/or one or more interactive elements 506 (e.g., links, buttons, drop down elements, etc.) for accessing the information 500 to be displayed on a display of the computing device 134, such as by serving the information to the computing device 134 and causing a user interface to display the information.

FIG. 5 illustrates that a FreshScore 104(2) associated with the perishable 106 can be displayed on the display of the computing device 134. In some examples, the FreshScore 104(2) can be displayed relative to a scale 508 having a minimum score and a maximum score. In the example of FIG. 5, the FreshScore 104(2) of 92 indicates that the score is at the high end of the scale 508. Additionally, or alternatively, the FreshScore 104(2) can be displayed as a color-coded score, wherein a color of the color-coded score is indicative of the freshness of the perishable 106. For example, a green-colored score may be indicative of a good/high score, and a red-colored score may be indicative of a bad/low score. In some examples, more than two colors may be used in a color-coding scheme, such as a yellow-colored score indicating a mediocre/average score. In addition to the FreshScore 104(2), FIG. 5 also illustrates that a producer ProofScore 104(1)(A) may be displayed on the computing device 134 of the user 140. Thus, multiple different scores 104 may be displayed and/or accessible to the user 140 via his/her computing device 134. The interactive elements 506 are similar to the interactive elements 406 depicted in FIG. 4, although, in the examples of FIG. 4 and FIG. 5, the information 500 displayed in association with a FreshScore 104(2) is different than the information 400 displayed in association with a ProofScore 104(1).

As mentioned above, the ProofScore 104(1) and the FreshScore 104(2) described herein are merely examples of scores 104 that can be computed by the computing system 102. Accordingly, it is to be appreciated that other types of scores, such as a GreenScore (or a SustainabilityScore, or ESGScore) that is a measure of the environmental performance of an entity associated with a perishable 106, or a DriverScore that is indicative of how well a driver did, or is going to do, on a route of the supply chain 108.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
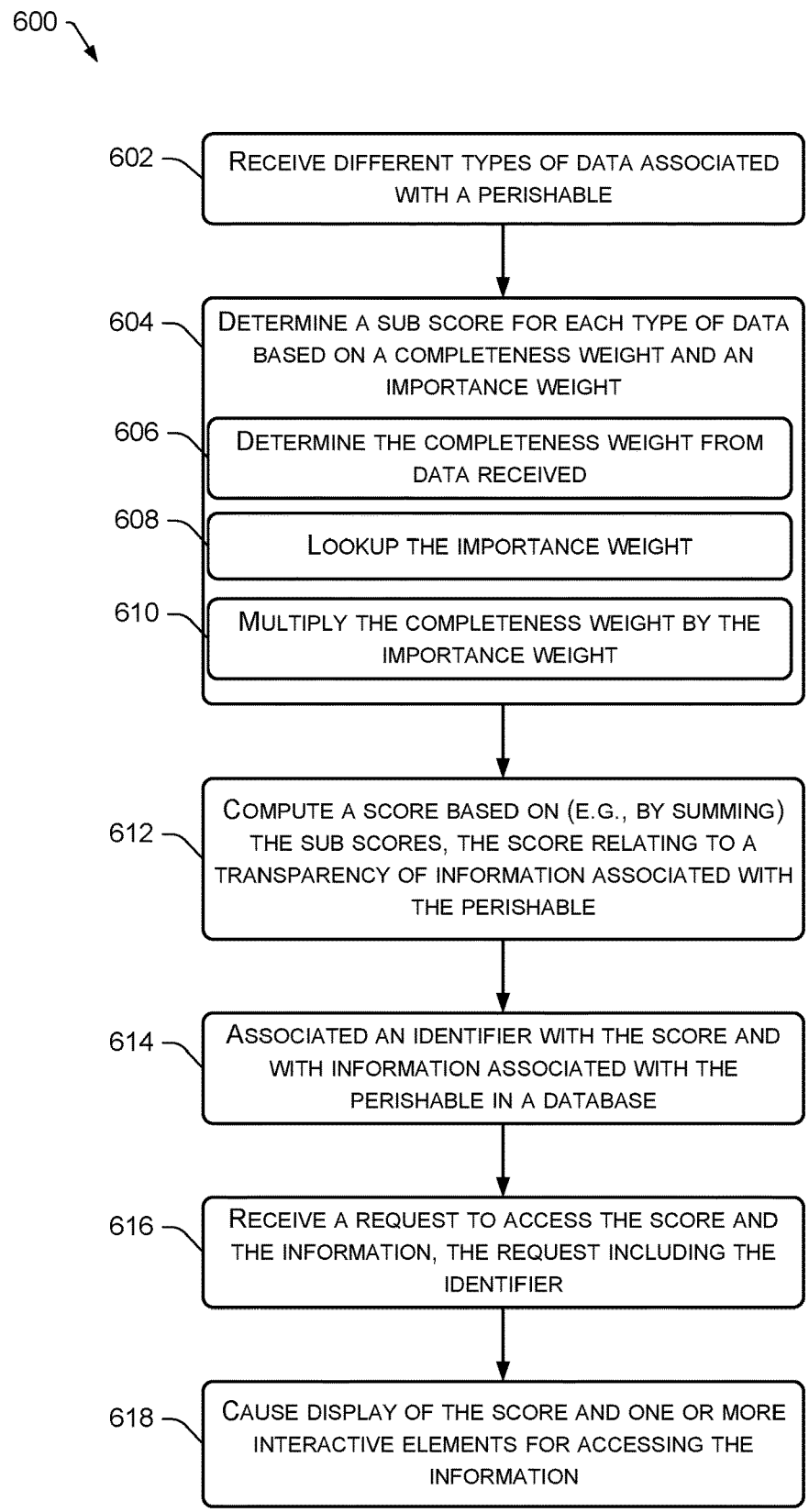
FIG. 6 is a flow diagram of an example process for determining, and providing users access to, a score(s) relating to transparency of information associated with a perishable.

FIG. 6 is a flow diagram of an example process 600 for determining, and providing users access to, a score(s) 104(1) relating to transparency of information associated with a perishable 106. The process 600 is described, by way of example, with reference to the previous figures. In some examples, the process 600 may be implemented by the computing system 102 described herein.

At 602, the computing system 102 may receive different types of data associated with a perishable 106. For example, the computing system 102 may receive first data 206(1) associated with the perishable 106, second data 206(2) associated with the perishable 106, and so on and so forth for any suitable number of different types of data. In some examples, the computing system 102 may receive the data 206 at block 602 from one or more other computing systems 208. For example, partners or entities associated with the supply chain 108 (e.g., the source 110, a carrier who employs delivery personnel (e.g., couriers), the processor 114, an entity associated with the warehouse 122, etc.) may provide the data 206 received at block 602 using their own computing system(s) 208. This data 206 is shared voluntarily by such entities. Additionally, or alternatively, the data received at block 602 may include sensor data 118 received from a sensor 116 associated with the perishable 106. For example, a sensor 116 within a threshold distance of the perishable 106 during transit of the perishable 106 along the supply chain 108, such as a sensor 116 attached to the perishable 106 or to an apparatus (e.g., a container, a pallet, etc.) being used to transport the perishable 106.

At 604, the computing system 102 may determine (e.g., using a model 128(1) of weights) a sub score for each type of data received at block 602 based at least in part on a completeness weight and an importance weight. For example, a first sub score may be determined at block 604 based at least in part on a first completeness weight and a first importance weight, wherein the first completeness weight is indicative of a completeness of the first data, and wherein the first importance weight is indicative of an importance of the first data. Similarly, a second sub score may be determined at block 604 based at least in part on a second completeness weight and a second importance weight, wherein the second completeness weight is indicative of a completeness of the second data, and wherein the second importance weight is indicative of an importance of the second data. Accordingly, any suitable number of sub scores may be determined at block 604, depending on the number of different types of data received at block 602. FIG. 2 illustrates an example of different types of data that may be received, and various example completeness weights and importance weights that may be used to determine sub scores for each of the different types of data. As shown by sub-blocks 606, 608, and 610, each sub-score may be determined by performing multiple operations.

At sub-block 606, the computing system 102 may determine the completeness weight for an individual sub score based at least in part on the data received at block 602. That is, the completeness weight may be determined by evaluating the completeness of the data received at block 602. In one example, the completeness scale may range from 2—Full information, 1—Partial Information, to 0—No information. Accordingly, sub-categories may be defined for the first data 206(1) depicted in FIG. 2, and if the data received at block 602 includes all sub-categories defined for that type of data, a maximum completeness weight (e.g., a completeness weight of 2 on a scale of 0 to 2) may be determined at block 606.

At sub-block 608, the computing system 102 may look up the importance weight for the individual sub score. In one example, the importance scale may range from 5—High Importance to 1—Low Importance. Accordingly, based on the importance of the data received at block 602, an importance weight indicative of the importance of the received data may be retrieved at block 608.

At sub-block 610, the computing system 102 may multiply the completeness weight by the importance weight to obtain the individual sub score. Sub-blocks 606, 608, and 610 may be repeated for each different type of data received at block 602 to determine respective sub scores for each type of data.

At 612, the computing system 102 may compute a score 104(1) based at least in part on the individual sub scores (e.g., a first sub score, a second sub score, etc.) determined at block 604. In some examples, the score 104(1) is computed at block 612 based on a sum of the sub scores (e.g., by summing the first sub score, the second sub score, and so on). The score 104(1) computed at block 612 relates to a transparency of information associated with the perishable 106. For example, the score 104(1) may represent a producer ProofScore 104(1)(A) relating to a transparency of information about a producer of the perishable 106. Alternatively, the score 104(1) may represent a product ProofScore 104(1)(B) relating to a transparency of information about the perishable 106 itself. In some examples, either a producer ProofScore 104(1)(A) or a product ProofScore 104(1)(B) is computed on a first pass through blocks 602-612, and the other of the producer ProofScore 104(1)(A) or the product ProofScore 104(1)(B) is computed on a second pass through blocks 602-612, resulting in a first score and a second score (e.g., two different ProofScores 104(1)(A) and 104(1)(B)). Furthermore, the information associated with the perishable 106 may be information that is derived from the different types of data received at block 602. Because the data received at block 602 may represent or include data about the producer of the perishable 106 and/or data about the perishable 106 itself, the information associated with the perishable 106 may represent or include information about the producer of the perishable and/or information about the perishable 106 itself.

At 614, the computing system 102 may associate an identifier with the score(s) 104(1) computed at block 612 and with the information associated with the perishable 106 within a database. This identifier allows users to access the score(s) 104(1) and/or the information related thereto. For example, in-store elements 402 (e.g., QR codes) can be associated with the identifier and used to lookup or otherwise access the score(s) 104(1) and/or related information.

At 616, the computing system 102 may receive, from a computing device 134, a request to access the score(s) 104(1) computed at block 612 and/or the related information, the request including the identifier. In some examples, receiving the request at block 616 is in response to the computing device 134 of a user 140 having been used to interact with an element 402 (e.g., scan a QR code) at a retail location 124 where the perishable 106 was delivered, the element 402 (e.g., QR code) associated with the identifier. An example of this is shown in FIG. 4.

At 618, the computing system 102 may cause display, on a display of the computing device 134, the score(s) 104(1) computed at block 612 and one or more interactive elements 406 for accessing the requested information 400. In some examples, this may involve causing the score(s) 104(1) to be displayed relative to a scale 408 having a minimum score and a maximum score, and/or causing the score 104(1) to be displayed as a color-coded score, wherein a color of the color-coded score is indicative of the transparency of the information associated with the perishable 106. In some examples, the information 400 accessible via the one or more interactive elements 406 includes origin information indicating where the perishable 106 came from, provenance information indicating how the perishable 106 arrived at a retail location 124, and/or environmental information indicating what happened to the perishable 106 along the way to the retail location 124.

Figure 7:
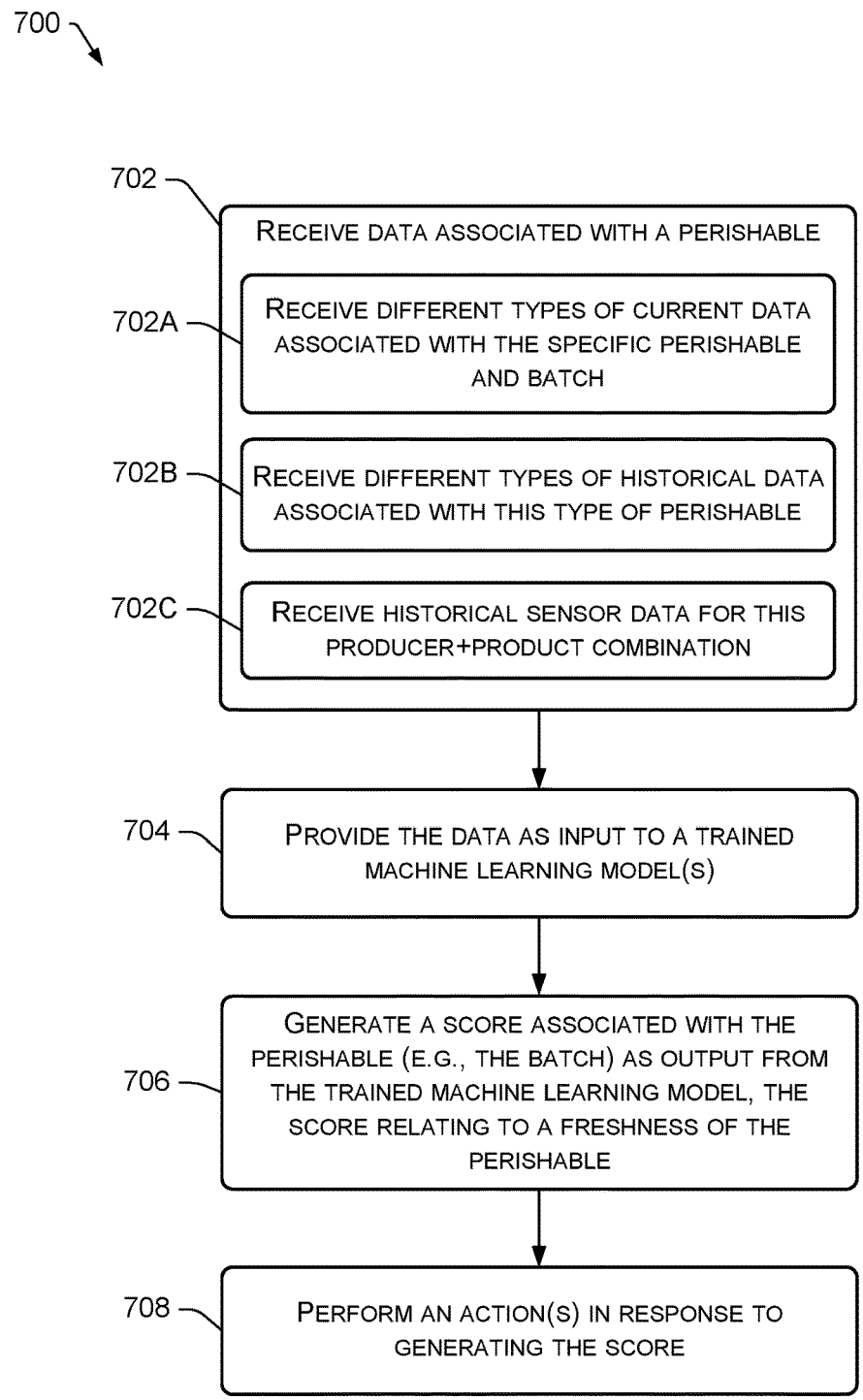
FIG. 7 is a flow diagram of an example process for determining a score(s) relating to a freshness of a perishable and performing an action(s) in response.

FIG. 7 is a flow diagram of an example process 700 for determining a score(s) 104(2) relating to a freshness of a perishable 106 and performing an action(s) in response. The process 700 is described, by way of example, with reference to the previous figures. In some examples, the process 700 may be implemented by the computing system 102 described herein.

At 702, the computing system 102 may receive data associated with a perishable 106. Various different types of data can be received at 702, as indicated by sub-blocks 702A to 702C. At 702A, for example, the computing system 102 may receive different types of current data associated with the specific perishable 106 and/or a batch including the perishable 106, where a batch includes perishables (e.g., food) gathered or processed within one typical production run. In one example, the data received at block 702A may include production data indicating a batch identifier, a producer identifier, a sell-by date associated with the perishable 106 (and/or the batch), a harvest (or harvest-by) date associated with the perishable 106 (and/or the batch), a typical (e.g., average) product shelf life, a typical (e.g., average) shipping duration, average historical FreshScore for this product type and this producer, and/or a ProofScore associated with this producer and/or product, if available, and/or any other suitable type of data. To illustrate, for batch 123 of Red Delicious apples from Transparent Orchards, the data received at block 702A may include a batch identifier (e.g., 123), a producer ID of Transparent Orchards, and/or a sell-by date, harvest (or harvest-by) date, shelf life, shipping duration, etc., as described above.

At 702B, as another example, the computing system 102 may receive different types of historical data associated with this type of perishable 106. In one example, the data received at block 702B may include historical score data indicative of previously-generated scores relating to perishable freshness (e.g., historical FreshScore measurements across all producers). Continuing with the running example for batch 123 of Red Delicious apples, the data received at block 702B may include historical FreshScore measurements for Red Delicious apples across all producers to find a general historical FreshScore range.

At 702C, as another example, the computing system 102 may receive historical sensor data 118 associated with the perishable 106 (e.g., sensor data 118 for the producer and the product in question. This may allow for identifying patterns within recorded environmental data that may affect freshness. Continuing with the running example, the data received at block 702C may allow for determining how Red Delicious apples from Transparent Orchards have typically rated, which trends may affect future FreshScores, etc. In some examples, the data received at block 702C may include sensor data 118 received, during transit of the perishable 106, from a sensor 116 that is within a threshold distance of the perishable 106. In some examples, the sensor 116 is attached to at least one of the perishable 106 or an apparatus (e.g., a case, a container, a pallet, etc.) being used to transport the perishable 106. In some examples, the sensor data 118 represents or includes temperature data indicating a temperature of an environment of the perishable 106 during transit, humidity data indicating a humidity of the environment of the perishable 106 during transit, tilt data indicating a tilt of the perishable 106 during transit, vibration data indicating a vibration of the perishable 106 during transit, light data indicating an amount of light in the environment of the perishable 106 during transit, air pressure data indicating an air pressure of the environment of the perishable 106 during transit, and/or altitude data indicating an altitude of the perishable 106 during transit. Although the examples above include sensor data 118 that may be received during transit of the perishable 106, it is to be appreciated that other types of sensor data may be obtained outside of transit of the perishable 106, such as from soil sensors, or the like.

At 704, the computing system 102 may provide the data received at block 702 as input to a trained machine learning model(s) 128(2). In some examples, a machine learning model(s) was, prior to receiving the data at block 702, trained using historical data associated with past shipments of perishables 106 (e.g., a particular type of perishable 106) to obtain the trained machine learning model(s) 128(2).

At 706, the computing system 102 may generate a score(s) 104(2) associated with the perishable 106 as output from the trained machine learning model(s) 128(2). The score(s) 104(2) generated at block 706 relates to a freshness of the perishable 106. In some examples, the score(s) 104(2) generated at block 706 can be used to classify the perishable 106 as one of multiple class labels indicative of a freshness of the perishable 106, and the class label may be stored in association with the score(s) 104(2) for the perishable 106 or with any other suitable data. A binary "fresh or spoiled" classification of a perishable 106 may be based on whether the score 104(2) satisfies a threshold.

At 708, the computing system 102 may perform one or more actions in response to the generating of the score(s) 104(2). In some examples, the one or more actions may allow users to access the score(s) 104(2) and/or related information, as described in more detail elsewhere herein, including more details with reference to FIG. 8. In some examples, the one or more actions may include storing the score(s) 104(2) as score data, and re-training the trained machine learning model(s) 128(2) using the score data. In this manner, the machine-learning model(s) continually learns from scores 104(2) that are generated.

Figure 8:
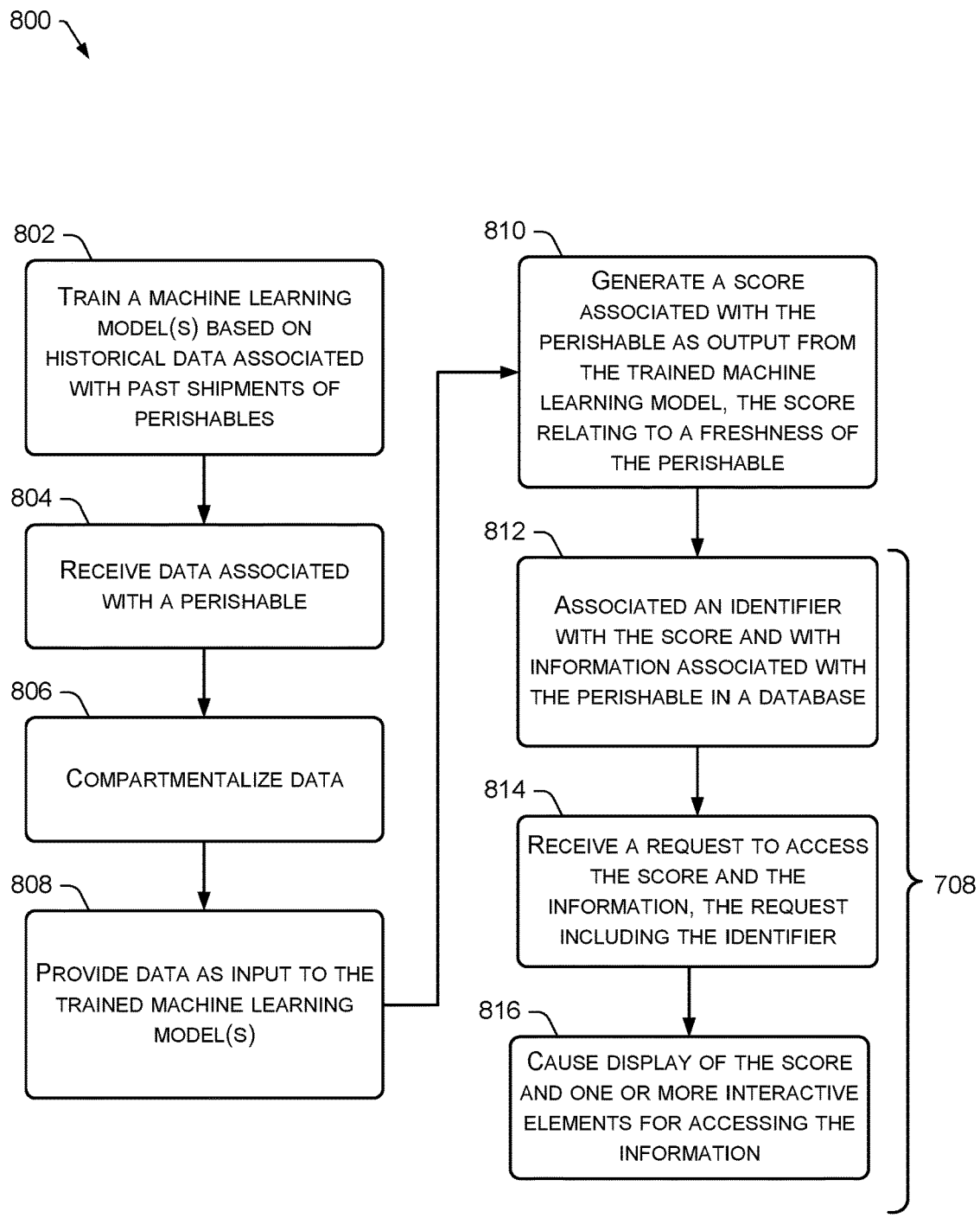
FIG. 8 is a flow diagram of an example process for determining, and providing users access to, a score relating to a freshness of a perishable.

FIG. 8 is a flow diagram of an example process 800 for determining, and providing users access to, a score(s) 104(2) relating to a freshness of a perishable 106. The process 800 is described, by way of example, with reference to the previous figures. In some examples, the process 800 may be implemented by the computing system 102 described herein.

At 802, the computing system 102 may train a machine learning model(s) using historical data (e.g., historical sensor data 118) associated with past shipments of perishables 106 to obtain the trained machine learning model(s) 128(2). In some examples, the machine learning model(s) 128 may trained for a specific type of perishable 106, such as apples. Accordingly, other machine learning models may be trained for other types of perishables 106, such as fish, milk, eggs, or the like. The machine learning model(s) 128(2) may be trained at block 802 using any suitable learning technique, such as supervised learning, unsupervised learning, semi-supervised learning, reinforcement learning, and so on, as described in more detail elsewhere herein.

At 804, the computing system 102 may receive data associated with a perishable 106. Any of the data described above with respect to block 702 of the process 700 may be received at block 804. In an example, the data received at block 804 may include sensor data 118 received, during transit of the perishable 106, from a sensor 116 that is within a threshold distance of the perishable 106. In some examples, the sensor 116 is attached to at least one of the perishable 106 or an apparatus (e.g., a container, a pallet, etc.) being used to transport the perishable 106. In some examples, receiving the sensor data 118 at block 804 includes receiving the sensor data 118 at multiple different times during the transit of the perishable 106 from a starting location to a destination location, the sensor data 118 representing multiple different data points of one or more parameters sensed by the sensor 116. In some examples, the sensor data 118 represents or includes temperature data indicating a temperature of an environment of the perishable 106 during transit, humidity data indicating a humidity of the environment of the perishable 106 during transit, tilt data indicating a tilt of the perishable 106 during transit, vibration data indicating a vibration of the perishable 106 during transit, light data indicating an amount of light in the environment of the perishable 106 during transit, air pressure data indicating an air pressure of the environment of the perishable 106 during transit, and/or altitude data indicating an altitude of the perishable 106 during transit.

At 806, the computing system 102 may compartmentalize the data received at block 804. For example, the data may be compartmentalized into first data (e.g., first sensor data 118) received before or during harvest of the perishable 106, second data (e.g., second sensor data 118) received after harvest and during storage of the perishable 106, third data (e.g., third sensor data 118) received during transit/transport of the perishable 106, and the like. These are merely examples, and other ways of compartmentalizing the data may be implemented and taken into consideration when using the trained machine learning model(s) 128(2) at the next block (block 808). Compartmentalizing the data may help to prepare, or preprocess, the data before it is analyzed for generating the FreshScore 104(2).

At 808, the computing system 102 may provide the data received at block 804 as input to a trained machine learning model(s) 128(2). In an example, sensor data 118 may be provided as input to the trained machine learning model(s) 128(2). In some examples, the data provided as input to the trained machine learning model(s) 128(2) at block 808 includes the compartmentalized data from block 806, and/or a sub-category(ies) of the data resulting from the compartmentalization At 810, the computing system 102 may generate a score(s) 104(2) associated with the perishable 106 as output from the trained machine learning model(s) 128(2). The score(s) 104(2) generated at block 810 relates to a freshness of the perishable 106. In some examples, the score(s) 104(2) generated at block 810 can be used to classify the perishable 106 as one of multiple class labels indicative of a freshness of the perishable 106, and the class label may be stored in association with the score(s) 104(2) for the perishable 106 or with any other suitable data.

At 812, the computing system 102 may associate an identifier with the score(s) 104(2) generated at block 810 and with the information associated with the perishable 106 within a database. This identifier allows users to access the score(s) 104(2) and/or the information related thereto. For example, in-store elements 402 (e.g., QR codes) can be associated with the identifier and used to lookup or otherwise access the score(s) 104(2) and/or related information.

At 814, the computing system 102 may receive, from a computing device 134, a request to access the score(s) 104(2) generated at block 810 and/or the related information, the request including the identifier. In some examples, receiving the request at block 814 is in response to the computing device 134 of a user 140 having been used to interact with an element 402 (e.g., scan a QR code) at a retail location 124 where the perishable 106 was delivered, the element 402 (e.g., QR code) associated with the identifier. An example of this is shown in FIG. 5.

At 816, the computing system 102 may cause display, on a display of the computing device 134, the score(s) 104(2) generated at block 810 and one or more interactive elements 506 for accessing the requested information 500. In some examples, this may involve causing the score(s) 104(2) to be displayed relative to a scale 508 having a minimum score and a maximum score, and/or causing the score 104(2) to be displayed as a color-coded score, wherein a color of the color-coded score is indicative of the transparency of the information associated with the perishable 106. In some examples, the information 500 accessible via the one or more interactive elements 506 includes origin information indicating where the perishable 106 came from, provenance information indicating how the perishable 106 arrived at a retail location 124, and/or environmental information indicating what happened to the perishable 106 along the way to the retail location 124. As indicated in FIG. 8, blocks 812, 814, and 816 of the process 800 may represent the actions performed at block 708 of the process 700, in some examples.

In some examples, the score(s) 104(2) relating to the freshness of the perishable 106 is static after the perishable reaches the shelf (e.g., at a retail location). However, in other examples, the score(s) 104(2) may be dynamically modified (e.g., over time) based on various factors, including how long the perishable 106 is on a store shelf. For example, the score(s) 104(2) may degrade over time the longer the perishable 106 is on the shelf (e.g., at a retail location).

Figure 9:
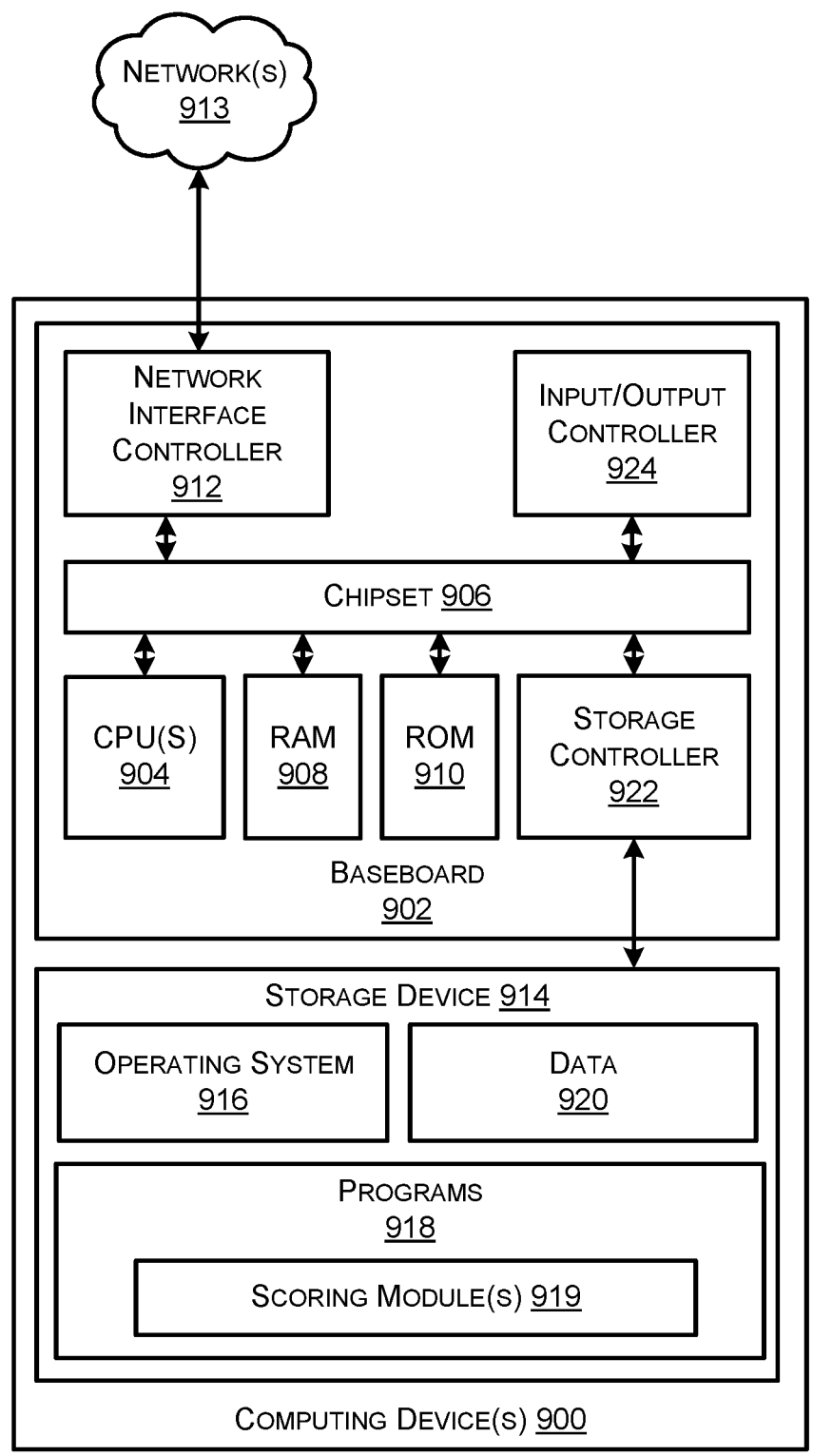
FIG. 9 is a computer architecture diagram showing an illustrative computer architecture for implementing a computing device(s) that can be utilized to implement aspects of the various technologies presented herein.

FIG. 9 shows an example computer architecture for a computing device(s) 900 capable of executing program components for implementing the functionality described above. The computer architecture shown in FIG. 9 may represent a workstation, desktop computer, laptop, tablet, network appliance, smartphone, server computer, or other computing device, and can be utilized to execute any of the software components presented herein. For example, the computing device(s) 900 may represent a server(s) of the computing system 102.

The computer 900 includes a baseboard 902, which is a printed circuit board (PCB) to which a multitude of components or devices can be connected by way of a system bus or other electrical communication paths. In one illustrative configuration, one or more CPUs 904 operate in conjunction with a chipset 906. The CPUs 904 can be standard programmable processors that perform arithmetic and logical operations necessary for the operation of the computer 900, and the CPUs 904 may be the same as, or similar to, the processor(s) 200 of FIG. 2.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may represent the "hardware bus" described above, and it can provide an interface to a RAM 908, used as the main memory in the computing device(s) 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computing device(s) 900 in accordance with the configurations described herein.

The computing device(s) 900 can operate in a networked environment using logical connections to remote computing devices and computer systems through a network, such as the networks 120, 136, 138 of FIG. 1. The chipset 906 can include functionality for providing network connectivity through a network interface controller (NIC) 912, such as a gigabit Ethernet adapter. The NIC 912 may be capable of connecting the computing device(s) 900 to other computing devices over the network 913, which may represent any one or more of the networks 120, 136, 138 of FIG. 1. It should be appreciated that multiple NICs 1012 can be present in the computing device(s) 900, connecting the computer to other types of networks and remote computer systems.

The computing device(s) 900 can be connected to a mass storage device 914 that provides non-volatile storage for the computer. The mass storage device 916 can store an operating system 916, programs 918, and data 920, to carry out the techniques and operations described in greater detail herein. For example, the programs 918 may include a scoring module(s) 919, such as the ProofScoring module(s) 204 and/or the FreshScoring module(s) 300 described herein, and the data 920 may include the model(s) 128, the sensor data 118, the custody data 126, and/or the scores 104 described elsewhere herein. The mass storage device 914 can be connected to the computing device 900 through a storage controller 922 connected to the chipset 906. The mass storage device 914 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device(s) 900 can store data on the mass storage device 914 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 914 is characterized as primary or secondary storage, and the like.

For example, the computing device(s) 900 can store information to the mass storage device 914 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device(s) 900 can further read information from the mass storage device 914 by detecting the physical states or characteristics of one or more particular locations within the physical storage units.

In addition to the mass storage device 914 described above, the computing device(s) 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device(s) 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 914 or other computer-readable storage media is encoded with computer-executable instructions which, when loaded into the computing device(s) 900, transform the computer from a general-purpose computing system into a special-purpose computer capable of implementing the configurations described herein. These computer-executable instructions transform the computing device(s) 900 by specifying how the CPUs 904 transition between states, as described above. According to one configuration, the computing device(s) 900 has access to computer-readable storage media storing computer-executable instructions which, when executed by the computing device(s) 900, perform the various processes described above. The computing device(s) 900 can also include computer-readable storage media storing executable instructions for performing any of the other computer-implemented operations described herein. Any of the computer-readable storage media depicted in FIG. 9 may be the same as, or similar to, the memory 202 of FIG. 2.

The computing device(s) 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the disclosed techniques and systems in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of" The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

What is claimed is:

1. A method for determining, and providing users access to, a score indicating a freshness of a perishable, the method comprising:
   clustering, by a computing system, a training data set associated with past shipments of perishables into multiple clusters to obtain a clustered training data set comprising:
      a packing cluster representing first sensor readings taken when a truck is stationary and is being packed with the perishables;
      a transit cluster representing second sensor readings taken when the truck is moving; and
      an unpacking cluster representing third sensor readings taken when the truck is stationary and has reached its destination;
   training, by the computing system, a machine learning model using the clustered training data set to obtain a trained machine learning model;
   receiving, by the computing system, data associated with the perishable;
   providing, by the computing system, the data as input to the trained machine learning model;
   generating, by the computing system, the score associated with the perishable as output from the trained machine learning model, the score indicating the freshness of the perishable;
   associating, by the computing system, within a database, an identifier with the score and with information derived from the data;
   receiving, by the computing system, from a computing device, a request to access the score and the information, the request including the identifier; and
   causing display, by the computing system, on a display of the computing device, the score and one or more interactive elements for accessing the information.

2. The method of claim 1, wherein the data comprises sensor data received, during transit of the perishable, from a sensor attached to at least one of the perishable or an apparatus being used to transport the perishable, and wherein the sensor data comprises at least one of:

temperature data indicating a temperature of an environment of the perishable during the transit;

humidity data indicating a humidity of the environment of the perishable during the transit;

tilt data indicating a tilt of the perishable during the transit;

vibration data indicating a vibration of the perishable during the transit;

light data indicating an amount of light in the environment of the perishable during the transit;

air pressure data indicating an air pressure of the environment of the perishable during the transit; or altitude data indicating an altitude of the perishable during the transit.

3. The method of claim 1, wherein the data comprises production data indicating at least one of a sell-by date associated with the perishable or a harvest date associated with the perishable.

4. The method of claim 1, wherein the data comprises historical score data indicative of previously-generated scores indicating perishable freshness.

5. The method of claim 1, wherein the causing the display of the score comprises at least one of:

causing the score to be displayed relative to a scale having a minimum score and a maximum score; or causing the score to be displayed as a color-coded score, wherein a color of the color-coded score is indicative of the freshness of the perishable.

6. The method of claim 1, wherein the receiving of the request is in response to the computing device having been used to scan an element at a retail location where the perishable was delivered, the element associated with the identifier.

7. The method of claim 1, wherein the training data set is clustered using a K-Medoids algorithm.

8. A method comprising:

clustering, by a computing system, a training data set associated with past shipments of perishables into multiple clusters to obtain a clustered training data set comprising:

a packing cluster representing first sensor readings taken when a truck is stationary and is being packed with the perishables;

a transit cluster representing second sensor readings taken when the truck is moving; and an unpacking cluster representing third sensor readings taken when the truck is stationary and has reached its destination;

training, by the computing system, a machine learning model using the clustered training data set to obtain a trained machine learning model;

receiving, by the computing system, data associated with a perishable;

providing, by the computing system, the data as input to the trained machine learning model;

generating, by the computing system, a score associated with the perishable as output from the trained machine learning model, the score indicating a freshness of the perishable; and performing, by the computing system, one or more actions in response to the generating of the score.

9. The method of claim 8, wherein the data comprises sensor data received, during transit of the perishable, from a sensor within a threshold distance of the perishable.

10. The method of claim 8, wherein the performing of the one or more actions comprises:

associating, by the computing system, within a database, an identifier with the score;

receiving, by the computing system, from a computing device, a request to access the score, the request including the identifier; and causing display, by the computing system, of the score on a display of the computing device.

11. The method of claim 8, wherein the data comprises at least one of:

production data indicating at least one of a sell-by date associated with the perishable or a harvest date associated with the perishable; or historical score data indicative of previously-generated scores relating te indicating perishable freshness.

12. The method of claim 8, further comprising:

storing the score as score data; and re-training the trained machine learning model using the score data.

13. The method of claim 9, wherein the receiving of the sensor data comprises receiving the sensor data at multiple different times during the transit of the perishable from a starting location to a destination location, the sensor data representing multiple different data points of one or more parameters sensed by the sensor.

14. The method of claim 10, wherein the causing the display of the score comprises at least one of:

causing the score to be displayed relative to a scale having a minimum score and a maximum score; or causing the score to be displayed as a color-coded score, wherein a color of the color-coded score is indicative of the freshness of the perishable.

15. The method of claim 10, wherein the receiving of the request is in response to the computing device having interacted with an element at a retail location where the perishable was delivered, the element associated with the identifier.

16. A system comprising:

one or more processors; and memory storing computer-executable instructions that, when executed by the one or more processors, cause performance of operations comprising:

clustering a training data set associated with past shipments of perishables into multiple clusters to obtain a clustered training data set comprising:

a packing cluster representing first sensor readings taken when a truck is stationary and is being packed with the perishables;

a transit cluster representing second sensor readings taken when the truck is moving; and an unpacking cluster representing third sensor readings taken when the truck is stationary and has reached its destination;

training a machine learning model using the clustered training data set to obtain a trained machine learning model;

receiving data associated with a perishable;

providing the data as input to the trained machine learning model;

generating a score associated with the perishable as output from the trained machine learning model, the score indicating a freshness of the perishable; and performing one or more actions in response to the generating of the score.

17. The system of claim 16, wherein the performing of the one or more actions comprises:
- associating, within a database, an identifier with the score;
- receiving, from a computing device, a request to access the score, the request including the identifier; and
- causing display of the score on a display of the computing device.

18. The system of claim 16, wherein the data comprises at least one of:
- production data indicating at least one of a sell-by date associated with the perishable or a harvest date associated with the perishable; or
- historical score data indicative of previously-generated scores indicating perishable freshness.

19. The system of claim 16, the operations further comprising:
- storing the score as score data; and
- re-training the trained machine learning model using the score data.

20. The system of claim 17, wherein the receiving of the request is in response to the computing device having interacted with an element at a retail location where the perishable was delivered, the element associated with the identifier.

* * * * *